United States Patent
Fevola et al.

(10) Patent No.: US 12,527,732 B2
(45) Date of Patent: *Jan. 20, 2026

(54) BIOBASED POLYGLYCERYL ESTERS AND COMPOSITIONS COMPRISING THE SAME

(71) Applicant: Inolex Investment Corporation, Wilmington, DE (US)

(72) Inventors: Michael J Fevola, Wilmington, DE (US); Gary B. Mosser, Wilmington, DE (US); Brittany M. Pease, Wilmington, DE (US); Zongyu Zhang, Wilmington, DE (US)

(73) Assignee: INOLEX INVESTMENT CORPORATION, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,471

(22) Filed: Oct. 8, 2022

(65) Prior Publication Data

US 2023/0111214 A1 Apr. 13, 2023

Related U.S. Application Data

(60) Provisional application No. 63/253,662, filed on Oct. 8, 2021.

(51) Int. Cl.
*A61K 8/85* (2006.01)
*A61K 8/02* (2006.01)
(Continued)

(52) U.S. Cl.
CPC .............. *A61K 8/85* (2013.01); *A61K 8/0291* (2013.01); *A61K 8/062* (2013.01); *A61Q 19/00* (2013.01)

(58) Field of Classification Search
None
See application file for complete search history.

(56) References Cited

U.S. PATENT DOCUMENTS

| 5,466,719 | A | | 11/1995 | Jakobson et al. |
| 5,707,610 | A | * | 1/1998 | Ibsen ..................... A61K 8/365 |
| | | | | 424/49 |

(Continued)

FOREIGN PATENT DOCUMENTS

| WO | 2015013951 A1 | 2/2015 |
| WO | 2020157433 A1 | 8/2020 |
| WO | WO 2022/098829 A1 | 5/2022 |

OTHER PUBLICATIONS

Zhang et al., Synthesis, Characterization, Self-Assembly, and Irritation Studies of Polyglyceryl-10 Caprylates, (2020), Polymers, 12, 294 (Year: 2020).*

(Continued)

*Primary Examiner* — Michael G. Hartley
*Assistant Examiner* — Kaila A Craig
(74) *Attorney, Agent, or Firm* — COZEN O'CONNOR

(57) ABSTRACT

The present invention relates to biobased polyglyceryl ester compounds and compositions and formulations comprising same, processes for preparing the inventive biobased polyglyceryl ester compositions, as well as applications thereof including the use of the inventive compounds and compositions in formulations of products or components of products. The biobased polyglyceryl ester composition may comprise a mixture including one or more compounds of Formula (I):

(Continued)

Degree of Esterification, DE (%)

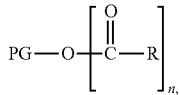

(I)

wherein: PG is a polyglyceryl group comprising greater than 40% hexaglycerol and higher polyglycerols and less than 60% pentaglycerol and lower polyglycerols, R is a linear or branched $C_5$-$C_8$ alkyl group, n=from 1 to 3, and
wherein substantially all of the carbon present in the one or more compounds of Formula (I) is biobased.

26 Claims, 2 Drawing Sheets

(51) Int. Cl.
*A61K 8/06* (2006.01)
*A61Q 19/00* (2006.01)

(56) References Cited

U.S. PATENT DOCUMENTS

| | | | |
|---|---|---|---|
| 5,902,590 | A | 5/1999 | Thomas et al. |
| 7,629,479 | B2 | 12/2009 | Kondo et al. |
| 8,227,393 | B2 | 7/2012 | Fevola |
| 2007/0232515 | A1* | 10/2007 | Takeuchi ............ A61Q 19/10 510/407 |
| 2009/0143489 | A1* | 6/2009 | Winn ............ A01N 37/28 514/788 |
| 2010/0196287 | A1 | 8/2010 | O'Connell |
| 2012/0157365 | A1 | 6/2012 | Fevola |
| 2013/0344152 | A1 | 12/2013 | Kozel |
| 2016/0022557 | A1* | 1/2016 | Galleguillos ............ A61Q 5/02 510/130 |
| 2017/0042779 | A1* | 2/2017 | Lou ............ A61Q 19/005 |
| 2017/0360035 | A1 | 12/2017 | Winn |
| 2019/0070114 | A1 | 3/2019 | Rigg |
| 2020/0155436 | A1* | 5/2020 | Hartung ............ A61Q 19/10 |
| 2021/0259930 | A1 | 8/2021 | Bevinakatti |
| 2021/0363086 | A1* | 11/2021 | Burgo ............ A61K 8/062 |

OTHER PUBLICATIONS

Lawan et al., Antimicrobial efficacy of caprylyl glycol and ethylhexylglycerine in emulsion, (2009), J Health Res, 23(1) 1-3 (Year: 2009).*
Zhang, Natural cosmetic preservation with Spectrastat complete solutions, (2020), Premium Beauty News (Year: 2020).*
Ataide et al., Toxicological analysis of the chronic consumption of diheptanoin and triheptanoin in rats, (2009), International Journal of Food Science and Technology, 443, 484-492 (Year: 2009).*
Clacens et al., Selective etherification of glycerol to polyglycerols over impregnated basic MCM-41 type mesoporous catalysts, (2002), Applied Catalysis, 181-190 (Year: 2002).*
Satyawali et al. (Lipase-catalyzed Solvent-free Synthesis of Polyglycerol 10 (PG-10) Esters, Dec. 3, 2019, Chemical and Biochemical Engineering Quarterly, 33(4):501-509) (Year: 2019).*
Krumins et al. (Glycerol-based sustainably sourced resin for volumetric printing, Feb. 5, 2024, Green Chem). (Year: 2024).*
Shikhaliev (Production and Emulsifying Effect of Polyglycerol and Fatty Acid Esters with Varying Degrees of Esterification, Sep. 8, 2016, J Am Oil Chem Soc, 93:1429-1440) (Year: 2016).*
Shikhaliev, et al., "Production and Emulsifying Effect of Polyclycerol and Fatty Acid Esters with Varying Degrees of Esterification," Journal of Oil Chem Soc. 2016, vol. 93, pp. 1429-1440. p. 1430, col. 1, para 2, Figure 1; p. 1433, Table 3.
Kato, et al., "Surfactant Properties of Purified Polyglycerol Monolaurates," Journal of Surfactants and Detergents, 2003, vol. 6(4), pp. 331-337, p. 333, Table 1; p. 335, Table 2.
Rokicki, Gabriel, et al., "Hyperbranched aliphatic polyethers obtained from environmental benign monomer: glycerol carbonate", Green Chemistry, Published May 10, 2005.
Extended European Search Report for Appl. No. PCT/US2022046130, issued on Aug. 28, 2025 from The Hague; Examiner Russell English.
Non-Final Office Action for U.S. Appl. No. 18/133,080, issued on Sep. 23, 2025.

* cited by examiner

BIOBASED POLYGLYCERYL ESTERS AND COMPOSITIONS COMPRISING THE SAME

CROSS REFERENCE TO RELATED APPLICATIONS

This application claims priority to U.S. Provisional Application No. 63/253,662, filed Oct. 8, 2021, which is incorporated herein by reference.

FIELD OF INVENTION

The present invention relates to biobased polyglyceryl ester compounds and compositions, formulations containing the compounds and compositions, methods of making and using the compounds, compositions, and formulations, and applications thereof that include inter alia cosmetic applications.

BACKGROUND OF THE TECHNOLOGY

Polyglycerol (PG) is readily esterified with fatty acids to yield polyglyceryl esters (PGEs), a well-known class of nonionic surfactants and emulsifiers that are frequently employed as food ingredients and in the formulation of cosmetics and personal care products. PGEs comprised of hydrophilic PG groups linked to lipophilic/hydrophobic fatty acyl groups by ester bonds demonstrate surface and interfacial activity due to their amphiphilic structures. PGE structures are typically designed to elicit maximum surface and interfacial activity to provide optimal performance at functions such as emulsification, solubilization/microemulsification, detergency, foam generation, and foam stabilization. PGEs have the advantage of being synthesized in bulk without the need for solvents and provided as 100% active anhydrous materials that do not require preservation against microbial contamination.

PGEs may be employed as surfactants for the solubilization or microemulsification of water-insoluble species in aqueous media to yield stable, clear, i.e. transparent, solutions. PGEs are useful for example to solubilize fragrances, essential oils, active ingredients, preservation components, and other ingredients with poor water solubility into clear aqueous formulations.

Nonionic surfactants are known to have an inactivating effect on microbiostatic ingredients (ingredients that are intended to inhibit the growth of microorganisms) and on microbiocidal ingredients (ingredients that are intended to kill microorganisms). For example, polyethoxylated sorbitan esters or polysorbates, are nonionic surfactants that are known to inhibit the antimicrobial activity of cosmetic preservatives.

There exists a need for nonionic surfactants that are capable of solubilizing or microemulsifying water-insoluble microbiostatic and microbiocidal ingredients to produce clear solutions without inhibiting the biological effects of such compounds. Such nonionic surfactants should be preferentially based on renewable carbon sources, i.e. plant-based carbon, due to the market demand for more sustainable ingredients and greater consumer appeal of so-called "natural" ingredients derived from renewable, biobased feedstocks.

BRIEF SUMMARY OF THE INVENTION

Applicants have discovered surprisingly that the biobased polyglyceryl ester compositions as described herein possess a precise balance between the hydrophilic and lipophilic characteristics of the polyglyceryl ester, which enables them to form stable, transparent aqueous solutions that do not inhibit the activity of microbiostatic/microbiocidal compounds used in formulations, for example, for preservation against microbial contamination.

In some embodiments, the present invention is directed to biobased polyglyceryl ester composition. The composition comprises:
a mixture including one or more compounds of Formula (I):

wherein: PG is a polyglyceryl group comprising greater than 40% hexaglycerol and higher polyglycerols and less than 60% pentaglycerol and lower polyglycerols,
R is a linear or branched $C_5$-$C_8$ alkyl group,
n=from 1 to 3, and
wherein substantially all of the carbon present in the one or more compounds of Formula (I) is biobased.

In other embodiments, the present invention is directed to a self-dispersing concentrate. The concentrate comprises the composition as in the preceding paragraph and a medium chain terminal diol. Optionally the concentrate comprises a medium chain alkylhydroxamic acid, a salt thereof, or combinations thereof. Optionally the concentrate comprises glycerin and/or a $C_3$-$C_4$ diol.

In yet other embodiments, the present invention is directed to a self-dispersing concentrate. The concentrate comprises:
from about 30% to about 90% biobased polyglyceryl ester, wherein biobased polyglyceryl ester is:
a mixture including one or more compounds of Formula (I):

wherein: PG is a polyglyceryl group comprising greater than 40% hexaglycerol and higher polyglycerols and less than 60% pentaglycerol and lower polyglycerols,
R is a linear or branched $C_5$-$C_8$ alkyl group,
n=from 1 to 3, and
wherein substantially all of the carbon present in the one or more compounds of Formula (I) is biobased;
from about 5% to about 50% medium chain diol;
from about 0.1% to about 20% medium chain alkylhydroxamic acid, a salt thereof, or combinations thereof; and
from about 1 to about 75% glycerin and/or a $C_3$-$C_4$ diol.

In yet other embodiments, the present invention is directed a formulation comprising the composition or concentrate as in any of the preceding paragraphs.

The present invention is further directed a process for preparing a biobased polyglyceryl ester composition. The process comprises:

mixing one or more compounds of Formula (I):

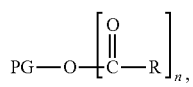

wherein: PG is a polyglyceryl group comprising greater than 40% hexaglycerol and higher polyglycerols and less than 60% pentaglycerol and lower polyglycerols and,
R is a linear or branched $C_5$-$C_8$ alkyl group,
n=from 1 to 3, and
wherein substantially all of the carbon present in the one or more compounds of Formula (I) is biobased.

The present invention is further directed to another process for preparing a self-dispersing concentrate. The process comprises:
preparing a biobased polyglyceryl ester by:
mixing one or more compounds of Formula (I):

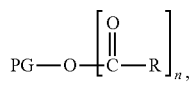

wherein: PG is a polyglyceryl group comprising greater than 40% hexaglycerol and higher polyglycerols and less than 60% pentaglycerol and lower polyglycerols,
R is a linear or branched $C_5$-$C_8$ alkyl group, and
n=from 1 to 3, and,
wherein substantially all of the carbon present in the one or more compounds of Formula (I) is biobased; and
combining the biobased polyglyceryl ester with a medium chain terminal diol.

In yet other embodiments, the present invention is directed a process for preparing a formulation comprising the biobased polyglyceryl ester composition and/or self-dispersing concentrate as in any of the preceding paragraphs.

BRIEF DESCRIPTION OF THE FIGURES AND DRAWINGS

DETAILED DESCRIPTION

Figure 1:
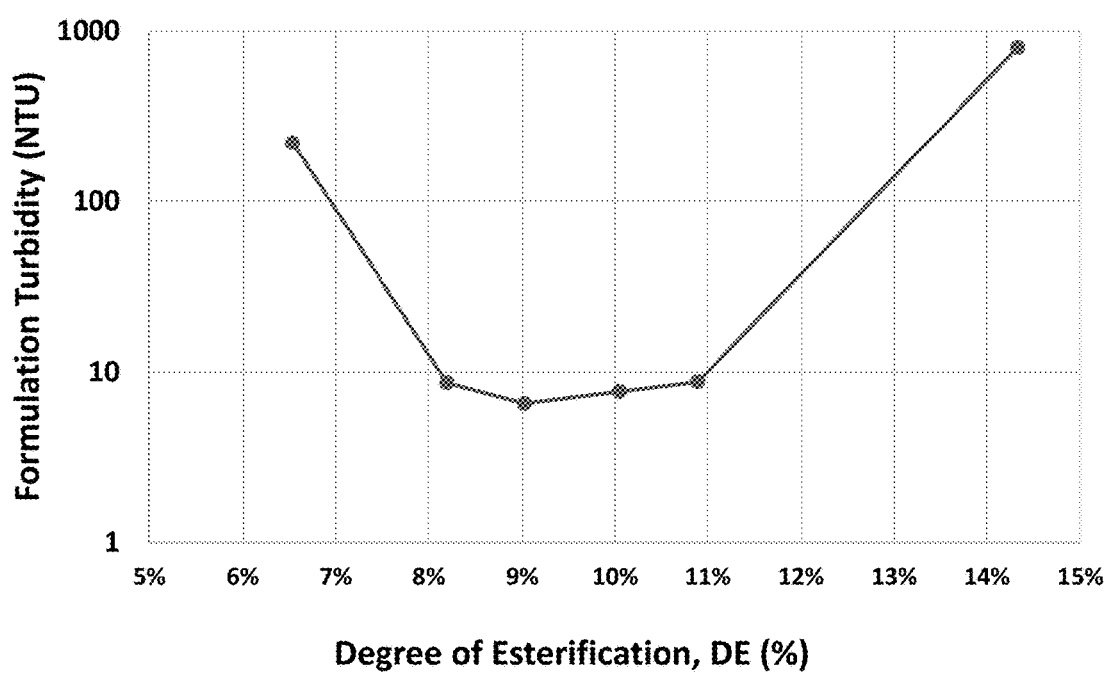
FIG. 1 illustrates the Turbidity of Spectrastat™ G2 Natural (1%) in a 5% solution of Polyglyceryl-10 Heptanoate as a function of the degree of esterification (DE) of the Polyglyceryl-10 Heptanoate.

Before the present compounds, compositions, and methods, among others, are described, it is to be understood that this invention is not limited to the particular processes, compositions, or methodologies described, as these may vary. It is also to be understood that the terminology used in the description is for the purpose of describing the particular versions or embodiments only and is not intended to limit the scope of the present invention which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to a "cell" is a reference to one or more cells and equivalents thereof known to those skilled in the art, and so forth.

Unless specified, "%" can refer to either a percent by weight or volume.

"Cosmetically acceptable" means suitable for use in contact with the skin without undue toxicity, incompatibility, instability, irritation, allergic response, and the like.

Where applicable, chemicals are specified by their INCI Name according to the guidelines of the International Nomenclature of Cosmetic Ingredients. Additional information, including suppliers and trade names, can be found under the appropriate INCI monograph in the International Cosmetic Ingredient Dictionary and Handbook, 16th Edition published by the Personal Care Products Council, Washington, DC, or online in the Personal Care Products INCIpedia (http://incipedia.personalcarecouncil.org).

Among the many embodiments, the present invention includes biobased compositions. Biobased or "natural" feedstocks must be used in the production of biobased compositions. An example of a biobased composition is one that is prepared from a bioderived feedstock (e.g., from current and sustainable agricultural activities, such as fermentation-, algae-, plant- or vegetable-derived; e.g., is derived from a vegetable source, preferably using a non-genetically modified organism, or biomass, and it is not petrochemically-derived (such as being derived from sustainable tree and plant farms active in the 21st century vs. fossil sources such as petroleum, natural gas, or coal). Such feedstocks are referred to herein as "natural" and "renewable" (i.e., "sustainable") and are known in the art as a non-petroleum-derived feedstock. Further, such materials are formed by "new" carbon and not from petroleum or other fossil fuel sources ("old" carbon). Such products are referred to herein as "natural" products and are known in the art as non-petrochemically-derived or "bio" products. As used herein, the term "sustainable" refers to starting materials, reaction products, compositions, and/or formulations that are derived from renewable sources. The term "sustainable" therefore is in contrast to "non-sustainable" starting materials, reaction products, compositions, and/or formulations that contain carbon from a limited natural resource, such as fossil fuel (e.g., petroleum or coal), natural gas, and the like. Thus, a natural or bio product is not petrochemically derived and/or is made from a source that is not petrochemically derived, but rather are sustainable and renewable. True natural products (bio-compounds) are formed using biomass (e.g., material stored from carbon cycle processes in living plants, roots, and the like, or released through animal respiration or refuse, or through decomposition). When carbon decomposes and is broken down over millions of years under pressure, it creates fossil fuels (the source of petrochemically-derived carbon). Bio-compounds herein are intended to include materials derived from the carbon of plant sources/biomass that exist(ed) recently and/or are sustainable, and explicitly excludes materials derived from fossil fuels.

A composition and/or formulation of the present invention can be identified and distinguished from prior art compositions and/or formulations by its biobased carbon content. In some embodiments, the biobased carbon content can be measured by radiocarbon dating to determine the relative age of materials comprised of organic (i.e., carbon-containing) matter. Radiocarbon is an unstable isotope of carbon, known as Carbon-14 (i.e., "$^{14}C$"). $^{14}C$ is an unstable isotope that emits radiation energy in the form of beta particles at a very consistent rate (i.e. a half-life for radiocarbon is 5730 years) and ultimately decays to the more stable Nitrogen-14 ($^{14}N$). Because, petroleum-based (i.e. petrochemically-derived) feedstocks are derived from plants and animals buried millions of years ago, such feedstocks' radiocarbon (i.e., $^{14}C$) has been lost to radioactive decay. The ASTM International standards provide testing methods to determine the authenticity of a "bio-based compound" using radiocarbon, which may be found in ASTM D6866-16. This standard distinguishes newer carbon from carbon derived from fossil-fuel, or petroleum- and petrochemically-derived sources, i.e., "old carbon". The amount of $^{14}C$ in recent or current biomass is known, so a percentage of carbon from a renewable source can be estimated from a total organic carbon analysis, which provides the data necessary to determine if a compound is truly derived from a "natural" and/or "sustainable" ("renewable") feedstock source or is derived conversely from a compound of "old" sequestration (i.e., a petrochemically-derived or petroleum-based source). The use of petroleum-based (also termed "fossil-based") feedstocks is generally accepted as being non-sustainable, i.e., old carbon is a non-sustainable and not a renewable feedstock and furthermore is not considered "natural" and/or "sustainable" in the art.

In some embodiments, the formulations and/or compositions of the present invention comprise biobased carbon as substantially all of the carbon present in the mixtures of compounds, which can refer to a biobased carbon content of at least 90%, at least 95%, or at least 98%.

In some embodiments, the compositions of the present invention comprise a $^{14}C$ content that is substantially equivalent to the present-day atmospheric $^{14}C$ content, as determined according to ASTM D6866. In some embodiments, the compositions of the present invention comprise a $^{14}C$ content that is at least about 90%, at least about 95%, at least about 98%, or at least about 99% of the present-day atmospheric $^{14}C$ content, as determined according to ASTM D6866. In some embodiments, the compositions of the present invention comprise at least about 0.8 $^{14}C$ atoms per $10^{12}$ carbon atoms present in the composition, at least about 1.0 $^{14}C$ atoms per $10^{12}$ carbon atoms present in the composition, or at least about 1.2 $^{14}C$ atoms per $10^{12}$ carbon atoms present in the composition, as determined according to ASTM D6866.

Alternatively, to distinguish a petroleum-based product from a truly natural and/or sustainable product, one may test for the authenticity via a detailed analysis of stable isotopes using mass spectroscopy and evaluating carbon-12/carbon-13 and/or hydrogen-1/hydrogen-2 ratios. Such testing is available through several analytical service testing organizations and is much faster, more cost effective, and yields more detailed information compared to radiocarbon testing methods.

Stable isotope analysis is based on the principle of kinetic isotope effect. The latter effect is well-known to those in the art of chemical kinetics. In the broadest terms, heavy isotopes of a particular element react slower than their lighter equivalent (e.g., carbon-12 as opposed to carbon-13). So, as plants incorporate carbon dioxide into their biomass, the ratio of carbon-12 to carbon-13 will vary depending on the type of chemistry used in the plant to make biomass (e.g., whether the plant undergoes a $C_3$ or $C_4$ photosynthesis pathway). This is commonly reported as the $\delta^{13}C/^{12}C$ ratio (i.e., $\delta^{13}C$), and is referenced to a current carbon dioxide standard. In addition, similar isotope kinetic effects are observed when water is incorporated into new biomass, and this is measured as the $\delta^2H/1H$ ratio (i.e., $\delta^2H$). Using a combination of $\delta^{13}C$ and $\delta^2H$ ratios, one familiar with in the relevant art is able to readily distinguish and validate the nature of the feedstock that was used to prepare the product being analyzed (i.e., whether it is petrochemically-derived or derived from recently living or living algae-, plant- or similar bio-sources).

By "sustainable" herein, the applicants refer to materials derived from renewable sources. In contrast "non-sustainable" refers to materials from a limited natural resource, such as a fossil fuel (e.g., petroleum, natural gas, coal, and the like).

Introduction

The present invention relates to a biobased polyglyceryl ester (PGE) composition comprising a mixture including one or more compounds of Formula (I):

wherein:
PG is a polyglyceryl group comprising greater than 40% hexaglycerol and higher polyglycerols and less than 60% pentaglycerol and lower polyglycerols;
R is a linear $C_5$-$C_8$ alkyl group,
n=from 1 to 3, and
wherein substantially all of the carbon present in the mixture of compounds having the structure of Formula (I) comprises biobased carbon.

Applicants have surprisingly discovered that a precise balance between the hydrophilic and lipophilic characteristics of the PGE composition must be established to provide PGE compositions that provide stable, transparent aqueous solutions and do not inhibit the activity of microbiostatic/microbiocidal compounds used for preservation against microbial contamination.

Inventive compositions possess a significant hydrophilic character, which is determined by the composition of the polyglyceryl moiety of the PGE. The inventive compositions also do not exceed a critical threshold of lipophilic character, which is determined by the carbon chain length of the fatty acyl moiety and the degree of esterification (DE) of the PGE composition.

Polyglycerol Having Glyceryl Repeat Units.

In some embodiments, the present invention is directed to esterified polyglycerols. Polyglycerol (PG) is a complex, polydisperse, low molecular weight polyether composed of repeat units that are based on dehydrated three-carbon glycerol groups, which can be linear, branched, or cyclic in nature. Examples of such glyceryl repeat units are found in G. Rokicki, G. et al. *Green Chem.* 2005, 7, 529-539, incorporated herein by reference, and include:

(a) linear-1,4 ($L_{1,4}$) PG repeat units of the Formula (IIa):

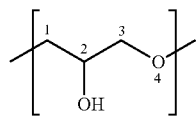

(IIa)

(b) linear-1,3 ($L_{1,3}$) PG repeat units of the Formula (IIb):

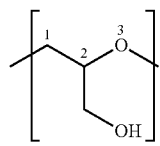

(IIb)

(c) dendritic (D) PG repeat units, which lead to branched and cyclic PGs, of the Formula (IIc):

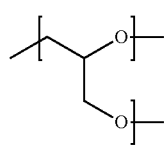

(IIc)

(d) terminal-1,2 ($T_{1,2}$) units (shown attached to a polyglyceryl moiety PG) of the Formula (IId):

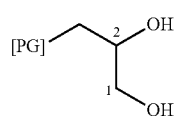

(IId)

and (e) terminal-1,3 ($T_{1,3}$) units (shown attached to a polyglyceryl moiety PG) of the Formula (IIe):

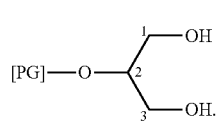

(IIe)

Individual PG molecules are described by the degree of glyceryl polymerization ($DP_{PG}$). That is, the PG molecules are described by the number of glyceryl repeat units present in the molecule, e.g., diglycerol has two glyceryl repeat units, triglycerol has three glyceryl repeat units, tetraglycerol has four glyceryl repeat units, and so forth. Polydisperse compositions comprised of various PG molecules are characterized by the distribution of PG molecules present in the composition, which may be defined in terms of the fractions of PG molecules having a particular $DP_{PG}$. Those skilled in the art will also recognize that PG compositions are typically referred to by their average $DP_{PG}$, for example, a polydisperse PG composition with an average $DP_{PG}=10$ may be referred to as decaglycerol or by the INCI Name Polyglycerin-10, despite being a polydisperse composition comprised of individual PG molecules with varying $DP_{PG}$ values. $DP_{PG}$ values may be determined and reported by any of the techniques known to those skilled in the art, including hydroxyl value determination, gas chromatography (GC), gas chromatography-mass spectroscopy (GC-MS), high performance liquid chromatography (HPLC), or HPLC with MS detection (HPLC-MS).

PG is extremely hydrophilic due to the presence of many pendant hydroxyl groups in primary and secondary positions; however, the hydroxyl values and hydrophilicity of PG decreases with increasing cyclic repeat unit content, as each cyclic repeat unit formed effectively consumes one pendant hydroxyl group. Biobased PG may be produced via the direct condensation polymerization of glycerol (purified glycerin) with water as the byproduct, or via ring-opening polymerization of glyceryl carbonate (GC), a cyclic carbonate monomer synthesized from glycerol. Other routes to PG exist, for example, via polymerization of glycidol or epichlorohydrin; however, these routes are less preferred, since most glycidol and epichlorohydrin are derived from nonrenewable feedstocks, and these monomers present significant health and safety hazards. In embodiments herein, PG is not derived via polymerization of glycidol or epichlorohydrin.

Polyglycerol Ester Compositions.

The hydrophilic character of the PGE composition is characterized by the PG distribution of the starting PG material prior to esterification and by the Hydroxyl Value (OHV) of the PGE composition following esterification. The preferred PG distribution is comprised of not less than 40% hexaglycerol and higher polyglycerols and not greater than 60% pentaglycerol and lower polyglycerols, where the OHV of the PGE composition are greater than about 500 mg KOH/g. In embodiments herein, the PG as in Formula (I) above is a polyglyceryl group comprising greater than 40% hexaglycerol and higher polyglycerols and less than 60% pentaglycerol and lower polyglycerols. In some embodiments, the PG is a polyglyceryl group comprises greater than 40% hexaglycerol and higher polyglycerols, e.g., greater than 45%, greater than 50%, greater than 55%, or greater than 60% hexaglycerol and higher polyglycerols. In some embodiments, the PG is a polyglyceryl group comprises less than 60% pentaglycerol and lower polyglycerols, e.g., less than 55%, less than 50%, less than 45%, or less than 40% pentaglycerol and lower polyglycerols.

As to the degree of esterification and distribution in the PGE compounds according to Formula (I), n equals from 1 to 3. Most compounds will be monoester (n=1). However there will be some PGE compounds in the composition substituted with 2 or possibly more fatty acyl groups. The compounds according to Formula (I) have an n value of from 1 to 3. In some embodiments, n=1, n=from 1 to 2, or n=from 1 to 3. In some embodiments, n=from 1 to 2. In some preferred embodiments, n=1 where the compound of Formula (I) includes a monoester. Those skilled in the art will recognize that a PGE composition that is on average a monoester of the starting polyglycerol may in fact comprise a distribution of unsubstituted polyglycerol, polyglyceryl monoesters, polyglycerol diesters, and even polyglycerol triesters. Thus, it is more practical to speak in terms of the average degree of esterification (DE) of the PGE composition rather than the individual PGE compounds The preferred lipophilic character of the PGE composition is achieved by using biobased fatty acids that do not exceed $C_9$, preferably biobased fatty acids having from $C_6$ to $C_8$, and maintaining a DE of less than about 15%.

The PGE compositions of the present invention may be synthesized by any number of methods known to those skilled in the art. The preferred route is the direct esterification of biobased PG (derived from condensation polymerization of vegetable glycerol) with biobased $C_6$ to $C_9$ fatty acids. Preferred biobased fatty acids include n-hexanoic acid (caproic acid), n-heptanoic acid (enanthic acid), n-octanoic acid (caprylic acid), and n-nonanoic acid (pelargonic acid). The PG and fatty acids are charged to a reactor and heated to drive ester formation with removal of the resulting water of reaction as a condensation byproduct. The reaction is preferentially conducted at atmospheric pressure with an inert gas sparge, such as nitrogen sparge, although vacuum may be applied to the system to improve water removal if necessary. The PGE compositions may also be synthesized via transesterification of simple esters, e.g. methyl or ethyl esters, of biobased $C_6$-$C_9$ fatty acids with removal of the alcohol byproduct of the reaction via heating, inert gas sparge, and/or application of vacuum.

The reaction is ideally conducted to reach a conversion where all of the fatty acid or simple ester thereof is consumed and converted to polyglyceryl ester. Residual fatty acid content is quantified as Acid Value (AV), and the PGE compositions of the present invention have AVs of less than about 2.0 mg KOH/g.

Applicants have discovered that the preferred PGE compositions of the present invention may be characterized by their dynamic surface activity in aqueous solution. Dynamic surface tension reduction, i.e. surface tension reduction as a function of time, is measured by bubble pressure tensiometry using the maximum bubble pressure (MBP) method. When dynamic surface tension data obtained from MBP experiments is plotted as a function of surface age, fitting of the data to a first-order decay function as in Formula (III) enables one to obtain the Surface Tension Equilibration Rate Constant (STERC) for a given surfactant at a specific concentration.

Surface Tension Equilibration Rate Constant (STERC) is calculated according to Formula (III):

$$\gamma_t = \gamma_{eq} + (\gamma_i - \gamma_{eq})^{-t/K} \qquad (III)$$

where:
$\gamma_t$=surface tension at time=t, in mN/m;
$\gamma_{eq}$=equilibrium surface tension, in mN/m;
$\gamma_i$=initial surface tension, in mN/m;
t=time, in ms; and
K=surface tension equilibration rate constant (STERC) in $ms^{-1}$.

The STERC provides an indication of how rapidly a surface-active species adsorbs to an air-water interface to lower the surface tension of an aqueous solution. Compounds with lower STERC values adsorb more strongly at the air-water interface and tend to remain there once adsorbed compared to compounds with greater STERC values, the latter having a tendency to adsorb and desorb more readily over the time scale of surface creation in the MBP experiment. This adsorption-desorption phenomenon can also serve as a proxy for the tendency of surfactants to remain in a micellar state once the micelle has formed.

Without wishing to be bound by theory, it is believed that surfactants exhibiting greater STERC values, i.e. longer times to achieve equilibrium surface tension due to weaker adsorption at the air-water interface, will also form more dynamic micelles due to enhanced micellar exchange and break-up. It is further believed that PGE compositions exhibiting greater STERC values will perform better as solubilizers for microbiostatic/microbiocidal compounds, as the more dynamic micellar behavior of these PGE compositions renders them less likely to inhibit the activity of these compounds via micellar entrapment/sequestration, a phenomenon known as "neutralization".

Tests Methods. Test methods used herein include:
Acid Value (AV): AOCS Official Method Te 2a-64;
Hydroxyl Value (OHV): AOCS Official Method Cd 13-60;
Saponification Value (SAP): AOCS Official Method Tl 2a-64; and
Calculation of Degree of Esterification (DE): DE=[(SAP−AV)/(SAP+OHV)]*100

$$DE\,(\%) = \left[\frac{(SAP - AV)}{(SAP + OHV)}\right] \times 100. \qquad (IV)$$

Determination of Critical Micelle Concentration (CMC) via Equilibrium Surface Tensiometry. Equilibrium surface tension values for determination of the CMC values were collected on each sample, at each concentration, by the Wilhelmy plate method using a standard 19.9 mm×0.2 mm platinum plate on a high resolution Kruss K100 Tensiometer, calibrated to +/−0.00001 g (+/−0.002 mN/m) with NIST standard weight, and to a pure distilled water standard surface tension of 72.50 mN/m+/−0.05 mN/m. Dipping distance for the plate was set to 3.00 mm prior to return to the surface within +/−0.01 mm for measurement of surface tension force. All tests were performed at 22° C.±0.2° C. For each surfactant a 1.00% stock solution in pure water was prepared and incrementally dosed into initially pure water to augment surfactant concentration while measuring surface tension after each concentration augmentation. Each surfactant was tested in duplicate runs at concentrations ranging from 0.001% to 0.500% of surfactant. The CMC value is taken at the intersection between the regression straight line of the linearly dependent region and the straight line passing through the plateau when surface tension is plotted as a function of concentration.

Determination of STERC via Bubble Pressure Tensiometry. Dynamic surface tensions were determined on a Kruss BP100 Bubble Pressure Tensiometer, using a 0.256 mm OD silane-treated glass capillary submerged to a depth of 1.00 cm for testing and buoyancy compensated. Tensiometer is calibrated with pure distilled water to 72.50 mN/m+/−0.1 mN/m as the total range of variance across the surface age ranged from 5 ms to 50,000 ms. All tests were performed at 22° C.±0.2° C. Dynamic surface tension measurements were conducted at the CMC. The STERC as reported herein is determined at the CMC and is obtained by plotting the dynamic surface tension as a function of surface age and fitting the data to the equation below to obtain a first-order rate constant for reduction of surface tension from the initial value to the equilibrium value.

(STERC) is calculated according to Formula (III) as above, and repeated here:

$$\gamma_t = \gamma_{eq} + (\gamma_i - \gamma_{eq})^{-t/K} \qquad (III)$$

where:
$\gamma_t$=surface tension at time=t, in mN/m;
$\gamma_{eq}$=equilibrium surface tension, in mN/m;

$\gamma_i$=initial surface tension, in mN/m;
t=time, in ms; and
K=surface tension equilibration rate constant (STERC) in ms$^{-1}$.

Compositions including biobased polyglyceryl esters may have a Surface Tension Equilibration Rate Constant (STERC) when measured at the critical micelle concentration (CMC) determined in deionized water at 22° C., for example, of greater than about 2000 ms$^{-1}$. The STERC value of these biobased polyglyceryl ester compositions can, for example, be in a range from about 2000 ms$^{-1}$ to about 4000 ms$^{-1}$, e.g., from about 2050 ms$^{-1}$ to about 3500 ms$^{-1}$, or from about 2100 ms$^{-1}$ to about 3250 ms$^{-1}$. In terms of lower limits, the STERC value of these biobased polyglyceryl ester compositions can be greater than about 2000 ms$^{-1}$, greater than about 2050 ms$^{-1}$, or greater than about 2100 ms$^{-1}$. In some embodiments, the biobased polyglyceryl ester composition have a STERC value of greater than about 2200 ms$^{-1}$.

Measurement of Turbidity via Nephelometric Turbidimetry. Clarity of solutions and formulations is reported as Aqueous Solution Turbidity (AST) or Formulation Turbidity (FT) measured in nephelometric turbidity units (NTU). Turbidity values were determined on an HF Scientific Micro 100 Benchtop Turbidity Meter operating at room temperature (23° C.±2° C.). Aqueous Solution Turbidity is an inherent property of a PGE composition when measured as specified at 5% in deionized water at 23±2° C.

Compositions including biobased polyglyceryl esters may have a low turbidity, such as an Aqueous Solution Turbidity (AST) as measured at 5% in deionized water at 23±2° C., for example, of less than about 10 NTU. The AST of the biobased polyglyceryl ester compositions herein should be as low as possible. The AST of these biobased polyglyceryl ester compositions can, for example, be in a range from about zero to about 10 NTU, e.g., from 0 NTU to 5 NTU, from 0 NTU to 2.5 NTU, from 0 NTU to 2 NTU, or from 0 NTU to 1 NTU. In terms of upper limits, the AST can be less than 10 NTU, e.g., less than 5 NTU, less than 2.5 NTU, less than 2 NTU, less than 1.5 NTU, less than 1 NTU, or less than 0.5 NTU. In some embodiments, the biobased polyglyceryl ester composition has an AST when measured at 5% in deionized water at 23±2° C. of less than about 10 NTU. In some embodiments, the AST is zero or essentially zero, e.g., below the limit of detection.

Microbiological challenge testing (MCT) of formulations to determine preservative efficacy. Challenge testing complying with the United States Pharmacopeia (USP) and PCPC compendial test methodologies was performed to determine the preservative efficacy of formulations against bacteria, yeast, and mold. Such testing is referred to in *Personal Care Products Council Technical Guidelines*, Microbiology Guidelines, 2018 Edition published by the Personal Care Products Council, Washington, DC and references cited therein, which are incorporated herein by reference.

The inventive PGE compositions are useful for the preparation of aqueous formulations, especially transparent or translucent formulations, comprising hydrophobic compounds that are either sparingly soluble or insoluble in water, such as fragrances, essential oils, active ingredients, preservation components, and other ingredients with poor water solubility in clear aqueous formulations. Formulations prepared with PGE compositions exhibit superior clarity and preservation efficacy against microbial contamination.

Formulations comprising the PGE compositions herein can include additional components or ingredients such as include surfactants, including anionic, nonionic, cationic and zwitterionic surfactants, emollients, humectants, conditioning agents, active agents, beaching or whitening agents, fragrances, colorants, exfoliating agents, antioxidants, botanical ingredients, mica, smectite, rheology modifiers, thickeners, cannabinoids, oils, dyes, waxes, amino acids, nucleic acids, vitamins, hydrolyzed proteins and derivatives thereof, glycerin derivatives (e.g. glyceride esters), enzymes, anti-inflammatory and other medicaments, microbiocides, antifungals, antiseptics, antioxidants, UV absorbers, dyes and pigments, preservatives, sunscreen active agents, antiperspirant active agents, oxidizers, pH balancing agents, moisturizers, peptides and derivatives thereof, anti-aging actives, hair growth promoters, anti-cellulite actives, and combinations thereof.

The PGE composition or formulation is, or may be a component of, a personal care product, a home care product, a textile care product, an institutional care product, a pharmaceutical product, a veterinary product, a food product, or an industrial product. In some embodiments, the compositions may be used in formulations, or may be a component of, a personal care product. Personal care products include a cosmetic product, a conditioner of hair, nails, skin or textiles, shampoo, a hair styling product, an oil or wax for grooming facial hair, a permanent wave liquid, a hair colorant, a face or body wash, a makeup removal product, a cleansing lotion, an emollient lotion or cream, a bar soap, a liquid soap, a shaving cream, foam, or gel, a sunscreen, a gel, lotion or cream for treating sunburn, a deodorant or anti-perspirant, a moisturizing gel, a shaving foam, a face powder, foundation, lipstick, blush, eyeliner, wrinkle or anti-aging cream, eye shadow, an eyebrow pencil, mascara, a mouthwash, a toothpaste, an oral care product, a skin cleansing product, a textile cleansing product, a dish cleaning product, a hair or fur cleansing product, and a skin lotion or moisturizer.

The PGE compositions may be used directly in formulations, such as in a formulation for a personal care product. The amount of PGE composition can, for example, be present in a formulation in a range from about 0.01 wt % to about 33 wt % e.g., from 0.025 wt % to 25 wt %, from 0.1 wt % to 15 wt %, or from 0.2 wt % to 10 wt %. In terms of upper limits, the amount of PGE can be less than 33 wt %, e.g., less than 25 wt %, less than 15 wt %, or less than 10 wt %. In terms of lower limits, the amount of amount of PGE composition can be greater than 0.01 wt %, e.g., greater than 0.025 wt %, greater than 0.1 wt %, or greater than 0.2 wt %.

Formulations comprising PGE compositions have a lower Formulation Turbidity (FT) values when measured water at 23±2° C., for example, of less than about 100 NTU. The FT of the formulations comprising PGE compositions herein should be as low as possible. The FT of these formulations can, for example, be in a range from about zero to about 100 NTU, e.g., from 0 NTU to 50 NTU, from 0 NTU to 25 NTU, from 0 NTU to 10 NTU, or from 0 NTU to 5 NTU. In terms of upper limits, the FT can be less than 100 NTU, e.g., less than 50 NTU, less than 25 NTU, less than 10 NTU, less than 5 NTU, less than 2.5 NTU, or less than 1 NTU. In some embodiments, the formulation comprising the PGE composition has a FT when measured at 5% in deionized water at 23±2° C. of less than about 10 NTU. In some embodiments, the FT is zero or essentially zero, e.g. below the limit of detection.

Self-Dispersing Concentrate (SDC).

The PGE compositions of the present invention may also be used to make self-dispersing concentrates (SDCs) that are useful for preparing transparent or translucent oil-in-water (O/W) microemulsions of hydrophobic compounds that are either sparingly soluble or insoluble in water. The SDCs exhibit exceptional clarity when dissolved in water, typically less than 10 NTU, and also form thermodynamically stable O/W microemulsions with good clarity, typically less than 100 NTU.

The inventive SDCs are useful for the preparation of transparent or translucent aqueous formulations comprising hydrophobic compounds that are either sparingly soluble or insoluble in water, such as fragrances, essential oils, active ingredients, preservation components, and other ingredients with poor water solubility in clear aqueous formulations. Formulations prepared with SDCs exhibit superior clarity and preservation efficacy against microbial contamination.

In some embodiments, the present invention is directed to SDCs including biobased polyglyceryl esters that may be used in formulations for various applications. The SDC composition or formulation is, or may be a component of, a personal care product, a home care product, a textile care product, an institutional care product, a pharmaceutical product, a veterinary product, a food product, or an industrial product. In some embodiments, the compositions may be used in formulations, or may be a component of, a personal care product. Personal care products include a cosmetic product, a conditioner of hair, nails, skin or textiles, shampoo, a hair styling product, an oil or wax for grooming facial hair, a permanent wave liquid, a hair colorant, a face or body wash, a makeup removal product, a cleansing lotion, an emollient lotion or cream, a bar soap, a liquid soap, a shaving cream, foam, or gel, a sunscreen, a gel, lotion or cream for treating sunburn, a deodorant or anti-perspirant, a moisturizing gel, a shaving foam, a face powder, foundation, lipstick, blush, eyeliner, wrinkle or anti-aging cream, eye shadow, an eyebrow pencil, mascara, a mouthwash, a toothpaste, an oral care product, a skin cleansing product, a textile cleansing product, a dish cleaning product, a hair or fur cleansing product, and a skin lotion or moisturizer.

SDCs as disclosed herein are suitable for use in formulations as a microemulsification system for water-insoluble ingredients or as a vehicle to introduce sparingly soluble or water-insoluble ingredient into a formulations. In some embodiments, the formulation is a thermodynamically stable O/W microemulsion.

In some instances, SDCs may be useful for preparing formulation concentrates that are easily combined with other ingredients and diluted with water to yield finished formulations. In some instances, SDCs have the benefit of being "cold-processable", i.e. they do not require heat for dispersion in aqueous solutions. In embodiments, these SDCs may include biobased polyglyceryl ester compositions as described above and, additionally, medium chain terminal diols (MCTD's). The biobased polyglyceryl esters of these embodiments may be compositions of Formula (I) as described above. These compositions may also be used in formulations, or may be a component of, a personal care product or other uses as described above. The biobased polyglyceryl esters can work synergistically with other ingredients, such as with MCTD's.

The most preferred diols for use in the concentrates or formulations described herein when used in cosmetic, toiletry and pharmaceutical applications are medium-chain length, linear vicinal diols that demonstrate microbiostatic and/or antimicrobial activity at relatively low use-levels. In some embodiments, the medium chain length is from $C_4$ to $C_{10}$ for the diols. Such diols include 1,2-pentanediol, 1,2-hexanediol, 1,2-heptanediol, 1,2-octanediol (caprylyl glycol), and 1,2-decanediol. Other vicinal diols useful in the compositions described herein include molecules derived from glycerin. Glycerin can be substituted with other molecules at its 1- or 3-position, leaving two vicinal hydroxyl groups. For example, glyceryl monoethers, such as ethylhexylglycerin, available commercially as Lexgard™ E from INOLEX, Inc., or methylheptylglycerin, available commercially as Lexgard™ MHG Natural MB from INOLEX Inc., are useful liquid vicinal diols having antimicrobial properties. Glyceryl monoesters such as glyceryl monolaurate, glyceryl monocaprate, glyceryl monopelargonate, glyceryl monoheptanoate, or glyceryl monocaprylate, the latter of which is commercially available as LEXGARD® GMCY from INOLEX, Inc., Philadelphia, Pa., are also useful antimicrobial vicinal diols.

In some embodiments, the medium chain terminal diol is at least one of a glyceryl monoester, a glyceryl monoether, a 1,2-alkanediol, and combinations thereof. The medium chain terminal diol may be a glyceryl monoester selected from the group consisting of: glyceryl monolaurate, glyceryl monocaprate, glyceryl monopelargonate, glyceryl monocaprylate, glyceryl monoheptanoate, and glyceryl monoundecylenate. The medium chain terminal diol may be a glyceryl monoether selected from the group consisting of: ethylhexylglycerin, methylheptylglycerin, caprylyl glyceryl ether, heptylglycerin, hexylglycerin, or cyclohexylglycerin. The medium chain terminal diol may be a 1,2-alkanediol selected from the group consisting of: 1,2-pentanediol, 1,2-hexanediol, 1,2-heptanediol, 1,2-octanediol (caprylyl glycol), and 1,2-decanediol.

For the preservation of cosmetics, toiletries and pharmaceuticals, vicinal diols are known to be effective against bacteria and yeast but weak against fungi. In the book, D. Steinberg, Preservatives for Cosmetics. 2nd ed, (2006), pg. 102, the author comments regarding vicinal diols that "[t]he weakest activity on all of these is fungi." In the article, D. Smith et al., "The Self-Preserving Challenge," Cosmetic & Toiletries, No. 1, 115, No. 5 (May 2000), vicinal diols are described as having activity against bacteria, but to be "limited against *Aspergillus*." Since *Aspergillus niger*, also known as *Aspergillus brasiliensis* is one of the microorganisms used in the PCPC challenge test, products with vicinal diols as described herein as the only ingredient for preservation may not sufficiently pass the PCPC challenge test.

The compositions of these embodiments may also include a chelating agent. Chelating agents suitable for use with the present inventive compositions, formulations, products, and methods include, but are not limited to, $C_6$ to $C_{10}$ alkylhydroxamic acids or alkylhydroxamate salts thereof, tetrasodium glutamate diacetate, phytic acid or salts thereof, gluconic acid or salts thereof, galacturonic acid or salts thereof, galactaric acid or salts thereof, and combinations thereof. In some embodiments, the chelating agent is caprylhydroxamic acid, a hydroxamate salt of caprylhydroxamic acid, or a combination thereof. In some embodiments, the chelating agent consists essentially of caprylhydroxamic acid, a hydroxamate salt of caprylhydroxamic acid, or a combination thereof. Adding a chelating agent, such as an alkylhydroxamic acid chelating agent, provides additional efficacy against fungi.

The SDCs include at least the following ingredients: biobased polyglyceryl ester compositions as described above and medium chain terminal diols. Optionally, the SDCs may include a medium chain alkylhydroxamic acid, a salt thereof, or combinations thereof. Optionally, the SDCs may include glycerin and/or a $C_3$-$C_4$ diol. Examples of optional $C_3$-$C_4$ diols include propanediol, 1,2-propanediol (propylene glycol), 1,3-propanediol, 1,2-butanediol, 1,3-butanediol, 2,3-butanediol, 1,4-butanediol, methylpropanediol, and combinations thereof.

The SDCs may include from about 30% to about 90% biobased polyglyceryl ester compositions of Formula (I) and from about 5% to about 50% of medium chain terminal diol. In some embodiments, the concentrate further includes from about 0.1% to about 20% medium chain alkylhydroxamic acid, a salt thereof, or combinations thereof. In some embodiments, the concentrate additionally or alternatively includes from about 1% to about 75% glycerin and/or a $C_3$-$C_4$ diol Other optional ingredients may be included in the SDCs as described below.

The SDCs can include biobased polyglyceryl ester compositions of Formula (I), e.g., include the composition of Formula (I), in a range from about 30 wt % to about 90 wt %, e.g., from 40 wt % to 85 wt %, from 45 wt % to 80 wt %, or from 50 wt % to 75 wt %. In terms of upper limits, the amount of the composition of Formula (I) can be less than 90 wt %, e.g., less than 85 wt %, less than 80 wt %, or less than 75 wt %. In terms of lower limits, the amount of the composition of Formula (I) can be greater than 30 wt %, e.g., greater than 40 wt %, greater than 45 wt %, or greater than 50 wt %.

The SDCs include medium chain terminal diols in a range from about 5 wt % to about 50 wt % e.g., from 7.5 wt % to 40 wt %, from 10 wt % to 30 wt %, or from 10 wt % to 25 wt %. In terms of upper limits, the amount of medium chain terminal diols can be less than 50 wt %, e.g., less than 40 wt %, less than 30 wt %, or less than 25 wt %. In terms of lower limits, the amount of medium chain terminal diols can be greater than 5 wt %, e.g., greater than 7.5 wt %, or greater than 10 wt %. The ratio of polyglyceryl ester to medium chain terminal diol in the SDC is from about 1:1 to about 10:1, preferably from about 2:1 to about 8:1, and more preferably from about 2:1 to about 7:1.

The SDCs include a medium chain alkylhydroxamic acid, a salt thereof, or combinations thereof in a range from about 0.1 wt % to about 20 wt % e.g., from 0.5 wt % to 17.5 wt %, from 1.0 wt % to 15 wt %, or from 2.0 wt % to 10 wt %. In terms of upper limits, the amount of medium chain alkylhydroxamic acid, a salt thereof, or combinations thereof can be less than 20 wt %, e.g., less than 17.5 wt %, less than 15 wt %, or less than 10 wt %. In terms of lower limits, the amount of medium chain terminal diols medium chain alkylhydroxamic acid, a salt thereof, or combinations thereof can be greater than 0.1 wt %, e.g., greater than 0.5 wt %, greater than 1.0 wt %, or greater than 2.0 wt %.

The SDCs include glycerin and/or a $C_3$-$C_4$ diol in a range from about 1.0 wt % to about 75 wt % e.g., from 2.5 wt % to 50 wt %, from 5 wt % to 50 wt %, or from 5 wt % to 25 wt %. In terms of upper limits, the amount of glycerin and/or a $C_3$-$C_4$ diol can be less than 75 wt %, e.g., less than 50 wt %, or less than 25 wt %. In terms of lower limits, the amount of glycerin and/or a $C_3$-$C_4$ diol can be greater than 1.0 wt %, e.g., greater than 2.5 wt %, or greater than 5 wt %.

Optionally, the SDCs include additional components or ingredients such as an organic acids and/or a polyol. The SDCs may include an organic acid selected from the group consisting of: benzoic acid, sorbic acid, p-anisic acid, levulinic acid, salicylic acid, citric acid, lactic acid, succinic acid, malonic acid, malic acid, fumaric acid, anisic acid, glycolic acid, salts thereof, and combinations thereof. The SDCs may include a polyol selected from the group consisting of: sorbitol, sorbitan, isosorbide, and combinations thereof. The SDCs may include a medium chain ($C_6$-$C_{10}$) fatty amide of the amino acid glycine, e.g. capryloyl glycine, or a salt thereof. In some embodiments, the SDC is substantially anhydrous, i.e. there is no water intentionally added to the SDC at the time of preparation, and the SDC contains less than about 2% water, e.g. adventitious moisture from processing or absorption from the atmosphere.

These components may be considered optional. In some cases, the disclosed compositions may expressly exclude one or more of the aforementioned ingredients in this section, e.g., via claim language. For example, claim language may be modified to recite that the disclosed compositions, formulations, processes, etc., do not utilize or comprise one or more of the aforementioned optional ingredients.

The SDCs can then be used in a subsequent formulation, such as in a formulation for a personal care product. The amount of SDC can, for example, be present in a formulation in a range from about 0.1 wt % to about 50 wt % e.g., from 0.25 wt % to 30 wt %, from 0.5 wt % to 15 wt %, or from 1.0 wt % to 10 wt %. In terms of upper limits, the amount of SDC can be less than 50 wt %, e.g., less than 30 wt %, less than 15 wt %, or less than 10 wt %. In terms of lower limits, the amount of amount of SDC can be greater than 0.1 wt %, e.g., greater than 0.25 wt %, greater than 0.5 wt %, or greater than 1.0 wt %.

Formulations comprising SDCs including biobased polyglyceryl esters and medium chain terminal diols have a lower Formulation Turbidity (FT) values when measured water at 23±2° C., for example, of less than about 100 NTU. The FT of the formulations comprising SDCs herein should be as low as possible. The FT of these SDC formulations can, for example, be in a range from about zero to about 100 NTU, e.g., from 0 NTU to 50 NTU, from 0 NTU to 25 NTU, from 0 NTU to 10 NTU, or from 0 NTU to 5 NTU. In terms of upper limits, the FT can be less than 100 NTU, e.g., less than 50 NTU, less than 25 NTU, less than 10 NTU, less than 5 NTU, less than 2.5 NTU, or less than 1 NTU. In some embodiments, the SDC has a FT when measured at 5% in deionized water at 23±2° C. of less than about 10 NTU. In some embodiments, the FT is zero or essentially zero, e.g. below the limit of detection.

Optionally, formulations comprising the SDCs herein can include additional components or ingredients such as include surfactants, including anionic, nonionic, cationic and zwitterionic surfactants, emollients, humectants, conditioning agents, active agents, beaching or whitening agents, fragrances, colorants, exfoliating agents, antioxidants, botanical ingredients, mica, smectite, rheology modifiers, thickeners, cannabinoids, oils, dyes, waxes, amino acids, nucleic acids, vitamins, hydrolyzed proteins and derivatives thereof, glycerin derivatives (e.g. glyceride esters), enzymes, anti-inflammatory and other medicaments, microbiocides, antifungals, antiseptics, antioxidants, UV absorbers, dyes and pigments, preservatives, sunscreen active agents, antiperspirant active agents, oxidizers, pH balancing agents, moisturizers, peptides and derivatives thereof, anti-aging actives, hair growth promoters, anti-cellulite actives, and combinations thereof.

Processes of Preparing Compositions and Concentrates Including Biobased Polyglyceryl Ester Compositions.

Processes of the present invention are directed to preparing biobased polyglyceryl ester compositions and self-dispersing concentrates, as well as formulations and/or components including biobased polyglyceryl ester compositions and self-dispersing concentrates.

A process for preparing a biobased polyglyceryl ester composition includes mixing one or more compounds of Formula (I). Formula (I) has been described in detail above.

The mixing may be performed in a flask, reactor, or other vessel as known in the art, and may include stirring. The mixing may include heating to a temperature of about 150-250° C. and may include using a nitrogen sparge. Condensed water is removed during the mixing. The mixing provides for the compounds to react until a desired conversion is achieved as indicated by an Acid Value. The mixing and reacting may include mixing for about 8-36 hr. In some embodiments, the conversion is achieved as indicate by an Acid Value of less than 2.0 mg KOH/g.

The process may include wherein n of Formula (I) is 1, 2, or 3. In some embodiments, n=1. R of Formula (I) may be a linear or branched $C_5$-$C_8$ alkyl group. In some embodiments, R is a linear $C_5$-$C_8$ alkyl group. In some embodiments, R is a linear $C_6$ alkyl group and RCO is derived from biobased n-heptanoic acid.

The process may include where PG of Formula (I) may be a polyglyceryl group comprising greater than 60% hexaglycerol and higher polyglycerols and less than 40% pentaglycerol and lower polyglycerols. In some embodiments, the process includes that the PG is a polyglyceryl group comprising greater than 60% hexaglycerol and higher polyglycerols and less than 40% pentaglycerol and lower polyglycerols.

The process may include that the biobased polyglyceryl ester composition has a hydroxyl value of greater than 500 mg KOH/g and degree of esterification (DE) of less than about 15%. In some embodiments, the process includes that the composition has an Acid Value (AV) of less than about 2 mg KOH/g.

The process may include that the biobased polyglyceryl ester composition has a Surface Tension Equilibration Rate Constant (STERC) of greater than about 2000 $ms^{-1}$ when measured at the critical micelle concentration (CMC) determined in deionized water at 22° C.

The process may include that the biobased polyglyceryl ester composition has an Aqueous Solution Turbidity of less than about 10 NTU when measured at 5% in deionized water at 23±2° C.

A process for preparing a self-dispersing concentrate including a biobased polyglyceryl ester composition may include mixing one or more compounds of Formula (I). The mixing and Formula (I) have been described in detail above. Following the mixing, the process includes combining the biobased polyglyceryl ester with a medium chain terminal diol. The process may include where n of Formula (I) is from 1 to 3. In some instances, n=1. In some instances, R is a linear $C_5$-$C_8$ alkyl group. In certain embodiments, R is a linear $C_6$ alkyl group and RCO is derived from biobased n-heptanoic acid. The PG can be a polyglyceryl group comprising greater than 60% hexaglycerol and higher polyglycerols and less than 40% pentaglycerol and lower polyglycerols.

In some embodiments, the combining includes from about 30% to about 90% of the biobased polyglyceryl ester and from about 5% to about 50% medium chain diol formulation.

Combining in the process for preparing a self-dispersing concentrate may further include a medium chain alkylhydroxamic acid, a salt thereof, or combinations thereof. In some embodiments, the combining includes from about 0.1% to about 20% medium chain alkylhydroxamic acid, a salt thereof, or combinations thereof.

Combining in the process for preparing a self-dispersing concentrate may further include glycerin and/or a $C_3$-$C_4$ diol. In some embodiments, the combining includes about 1 to about 75% of glycerin and/or a $C_3$-$C_4$ diol.

The process may include preparing a formulation from the biobased polyglyceryl ester composition and/or from the SDC. Yet additional ingredients as described above may be additionally combined depending upon the end-use formulation. The formulations or compositions may be a component of a personal care product, a home care product, a textile care product, an institutional care product, a pharmaceutical product, a veterinary product, a food product, or an industrial product. Personal care products producible by the process herein include a cosmetic product, a conditioner of hair, nails, skin or textiles, shampoo, a hair styling product, an oil or wax for grooming facial hair, a permanent wave liquid, a hair colorant, a face or body wash, a makeup removal product, a cleansing lotion, an emollient lotion or cream, a bar soap, a liquid soap, a shaving cream, foam, or gel, a sunscreen, a gel, lotion or cream for treating sunburn, a deodorant or anti-perspirant, a moisturizing gel, a shaving foam, a face powder, foundation, lipstick, blush, eyeliner, wrinkle or anti-aging cream, eye shadow, an eyebrow pencil, mascara, a mouthwash, a toothpaste, an oral care product, a skin cleansing product, a textile cleansing product, a dish cleaning product, a hair or fur cleansing product, and a skin lotion or moisturizer.

These detailed descriptions serve to exemplify the above general descriptions and embodiments which form part of the invention. These detailed descriptions are presented for illustrative purposes only and are not intended as a restriction on the scope of the invention.

EXAMPLES

Example 1: Synthesis of Polyglyceryl-10 Heptanoate Composition

A Polyglyceryl-10 Heptanoate PGE composition was synthesized as follows: To a 1-liter four-neck round bottom flask equipped with an overhead mechanical stirrer, heating mantle, temperature controller, condenser/receiver, and nitrogen sparge, were added biobased Polyglycerin-10 conforming to the specifications in Table 1 (Pure Vegetable Polyglycerine-10, Spiga Nord SpA, 598 g, 0.78 mol) and bio-heptanoic acid (Oleris® n-Heptanoic Acid, Arkema, 152 g, 1.17 mol). The contents of the flask were heated to 200° C. while stirring at moderate speed, and using a nitrogen sparge at a rate of 0.10 L/min. The reaction was held under these conditions to remove the condensation water. The reaction proceeded until desired conversion was achieved (as indicated by an Acid Value of <2.0 mg KOH/g), which took approximately 18 hr. The reactor was then cooled to 80° C. and the contents discharged into an appropriate container for storage.

TABLE 1

Specifications of biobased Polyglycerin-10 and Polyglycerin-6 starting materials.

| | Polyglycerin-10 | | Polyglycerin-6 | |
|---|---|---|---|---|
| Component | % Min. | % Max. | % Min. | % Max. |
| Glycerol | — | ≤1 | — | ≤1 |
| Diglycerol | — | ≤10 | — | ≤10 |
| Tetraglycerol + Pentaglycerol | >50 | — | >50 | — |
| Hexaglycerol and higher | >40 | — | >20 | — |

Examples 2-6: Synthesis of Polyglyceryl-10 Heptanoate Compositions

Examples 2-6 were prepared in a similar manner to Example 1, only the molar ratio of bio-heptanoic acid to Polyglycerin-10 was varied according to the values listed in Table 2.

Example 7: Synthesis of Polyglyceryl-10 Hexanoate Composition

A Polyglyceryl-10 Hexanoate PGE composition was synthesized as follows: To a 1-liter four-neck round bottom flask equipped with an overhead mechanical stirrer, heating mantle, temperature controller, condenser/receiver, and nitrogen sparge, were added biobased Polyglycerin-10 conforming to the specifications in Table 1 (Pure Vegetable Polyglycerine-10, Spiga Nord SpA, 607 g, 0.8 mol) and bio-hexanoic acid (Hexanoic Acid, Natural, >98%, Sigma Aldrich, 93 g, 0.8 mol). The contents of the flask were heated to 200° C. while stirring at moderate speed, and using a nitrogen sparge at a rate of 0.10 L/min. The reaction was held under these conditions to remove the condensation water. The reaction proceeded until desired conversion was achieved (as indicated by an Acid Value of <2.0 mg KOH/g), which took approximately 20 hr. The reactor was then cooled to 80° C. and the contents discharged into an appropriate container for storage.

Example 8: Synthesis of Polyglyceryl-10 Caprylate Composition

A Polyglyceryl-10 Caprylate PGE composition was synthesized as follows: To a 1-liter four-neck round bottom flask equipped with an overhead mechanical stirrer, heating mantle, temperature controller, condenser/receiver, and nitrogen sparge, were added biobased Polyglycerin-10 conforming to the specifications in Table 1 (Pure Vegetable Polyglycerine-10, Spiga Nord SpA, 607 g, 0.8 mol) and bio-caprylic acid (Caprylic Acid, 99%, FA C0899, Unilever Oleochemical, 112 g, 0.8 mol). The contents of the flask were heated to 200° C. while stirring at moderate speed, and using a nitrogen sparge at a rate of 0.10 L/min. The reaction was held under these conditions to remove the condensation water. The reaction proceeded until desired conversion was achieved (as indicated by an Acid Value of <2.0 mg KOH/g), which took approximately 15 hr. The reactor was then cooled to 80° C. and the contents discharged into an appropriate container for storage.

TABLE 2

Inventive Examples of PGE Compositions and Comparative Examples.

| | INCI | RATIO (FA/PG) | AV | OHV (mg KOH/g) | SAP | DE | AST @ 5% (NTU) | AST @ 10% (NTU) |
|---|---|---|---|---|---|---|---|---|
| | | | | Example | | | | |
| E1 | Polyglyceryl-10 Heptanoate | 1.5 | 1.4 | 528.3 | 90.0 | 14.3% | 4.7 | 2.8 |
| E2 | Polyglyceryl-10 Heptanoate | 1.0 | 1.25 | 637.4 | 64.6 | 9.0% | 2.68 | 1.55 |
| E3 | Polyglyceryl-10 Heptanoate | 0.75 | 0.52 | 678.7 | 48.0 | 6.5% | 0.91 | 0.91 |
| E4 | Polyglyceryl-10 Heptanoate | 1.1 | 1.15 | 611.7 | 69.6 | 10.0% | 3.2 | 1.18 |
| E5 | Polyglyceryl-10 Heptanoate | 0.9 | 1.1 | 630.8 | 57.5 | 8.2% | 1.14 | 1.47 |
| E6 | Polyglyceryl-10 Heptanoate | 1.2 | 1.05 | 599.1 | 74.4 | 10.9% | 6.57 | 3.4 |
| E7 | Polyglyceryl-10 Hexanoate | 1.0 | 1.1 | 614.9 | 66.7 | 9.6% | 1.65 | 3.1 |
| E8 | Polyglyceryl-10 Caprylate | 1.0 | 0.52 | 617.4 | 64.7 | 9.4% | 1.32 | 2.4 |
| | | | | Comparative Examples | | | | |
| CE1 | Polyglyceryl-4 Heptanoate | 1.0 | 1.05 | 641.6 | 140.4 | 17.8% | insoluble | insoluble |
| CE2 | Polyglyceryl-6 Heptanoate | 1.0 | 0.65 | 650.6 | 114.6 | 14.9% | insoluble | insoluble |
| CE3 | Polyglyceryl-10 Caprylate | — | 0.54 | 491.7 | 75.8 | 13.3% | 1.45 | 1.61 |
| CE4 | Heptyl Glucoside | — | — | 496.9 | — | — | 0.65 | 1.2 |
| CE5 | Polyglyceryl-10 Caprylate/Caprate | — | 4.0 | 550.4 | 96.4 | 14.3 | 5.1 | 5.7 |

Comparative Example 1: Synthesis of Polyglyceryl-4 Heptanoate Composition

A Polyglyceryl-4 Heptanoate PGE composition was synthesized according to the procedure of Example 1, only biobased Polyglycerin-4 conforming to the specifications in Table 3 (Pure Vegetable Polyglycerine-4, Spiga Nord SpA) was used in a 1:1 molar ratio with the bio-heptanoic acid.

TABLE 3

Specifications of biobased Polyglycerin-4 starting material.

| | Polyglycerin-4 | |
|---|---|---|
| Component | % Min. | % Max. |
| Glycerol | — | ≤1 |
| Diglycerol | — | ≤15 |

TABLE 3-continued

Specifications of biobased Polyglycerin-4 starting material.

| Component | Polyglycerin-4 % Min. | Polyglycerin-4 % Max. |
|---|---|---|
| Triglycerol + Tetraglycerol | >65 | — |
| Diglycerol + Triglycerol + Tetraglycerol | >75 | — |
| Tetraglycerol and higher | >50 | — |
| Heptaglycerol and higher | — | ≤10 |

Comparative Example 2: Synthesis of Polyglyceryl-6 Heptanoate Composition

A Polyglyceryl-6 Heptanoate PGE composition was synthesized according to the procedure of Example 1, only biobased Polyglycerin-6 conforming to the specifications in Table 1 (Pure Vegetable Polyglycerine-6, Spiga Nord SpA) was used in a 1:1 molar ratio with the bio-heptanoic acid.

Comparative Example 3: Commercially Available Polyglyceryl-10 Caprylate

A commercial sample of a Polyglyceryl-10 Caprylate PGE composition (SY-Glyster MCA-750, Decaglycerol monocaprylate) was obtained from Sakamoto Yakuhin Kogyo Co., Ltd. and used as received.

Comparative Example 4: Commercially Available Heptyl Glucoside

A commercial sample of Heptyl Glucoside, a $C_7$ alkyl polyglucoside surfactant, (Sepiclear G7) was obtained from Seppic, Inc. and used as received. The material is provided as a 70-75% solution in water. Heptyl Glucoside is an alkyl polyglucoside (not a PGE) that is a highly effective solubilizer for the preparation of O/W microemulsions (see U.S. Pat. No. 9,080,132) and is included herein as a comparative performance benchmark.

Comparative Example 5: Commercially Available Polyglyceryl-10 Caprylate/Caprate

A commercial sample of a Polyglyceryl-10 Caprylate/Caprate PGE composition (Polyaldo 10-1-CC K) was obtained from Arxada (formerly Lonza) and used as received.

Characterization data (AV, OHV, SAP, and DE) for Examples 1-8 and Comparative Examples 1-4 are reported in Table 2. As Comparative Example 4 is an ether and not an ester, only the OHV was determined. The water solubility and clarity of the biobased PGE compositions was evaluated by preparing 5% and 10% aqueous solutions of the PGE compositions in deionized water; the data are reported in Table 2. Examples 1-8 prepared with Polyglycerin-10 were readily water-soluble and formed transparent solutions that exhibited good clarity with AST values less than 7.0 NTU. Comparative Examples 1 and 2, prepared with Polyglycerin-4 and Polyglycerin-6, respectively, were insoluble in water and did not form clear solutions. Example 1-8 demonstrate the importance of selecting a polyglycerin precursor comprised of not less than 40% hexaglycerol and higher polyglycerols and not greater than 60% pentaglycerol and lower polyglycerols to ensure solubility and clarity. Comparative Examples 3-4 formed clear solutions with low turbidity values.

TABLE 4

CMC and STERC values for Examples 2, 4, and 6-8 and Comparative Examples 3-4.

| Example | | INCI | CMC (wt %) | STERC at CMC (ms$^{-1}$) |
|---|---|---|---|---|
| E2 | | Polyglyceryl-10 Heptanoate | 0.0304 | 2115 |
| E4 | | Polyglyceryl-10 Heptanoate | 0.0314 | 2225 |
| E6 | | Polyglyceryl-10 Heptanoate | 0.0324 | 2288 |
| E7 | | Polyglyceryl-10 Hexanoate | 0.0437 | 2416 |
| E8 | | Polyglyceryl-10 Caprylate | 0.0314 | 2205 |
| Comparative Examples | | | | |
| CE3 | Glyster MCA-750 (SY Kogyo) | Polyglyceryl-10 Caprylate | 0.0392 | 1964 |
| CE4 | Sepiclear G7 (SEPPIC) | Heptyl Glucoside | 0.0672 | 3226 |

Example 9: Determination of CMC and STERC Values

Values of CMC and the STERC at the CMC were determined for several of the inventive PGE compositions (Examples 2, 4, and 6-8) and for the Comparative Examples. The results are reported in Table 4. STERC values for the inventive PGE compositions are greater than 2000 ms$^{-1}$, whereas the comparative PGE composition, Comparative Example 3 exhibits a STERC less than 2000 s$^{-1}$. Comparative Example 4, the commercial performance benchmark Heptyl Glucoside, exhibited a STERC of 3226 ms$^{-1}$.

Example 10: Solubilization of a Multifunctional Preservation System

Spectrastat™ G2 Natural is a 100% biobased multifunctional preservation system manufactured by INOLEX, Inc. and is comprised of Glyceryl Caprylate, Caprylhydroxamic Acid, and Glycerin. Spectrastat™ G2 Natural is not readily water-soluble and does not form transparent solutions. The solubilization performance of Examples 1-8 and Comparative Examples 3-4 was evaluated by determining the FT of 1% Spectrastat™ G2 Natural in an aqueous solution containing 5% solubilizer (note that Comparative Example 4 was used at 5% as supplied to provide ca. 3.5% active Heptyl Glucoside). The turbidity values are reported in Table 5.

TABLE 5

Solubilization of 1% Spectrastat™ G2 Natural by 5% solubilizer.

| Example | INCI | DE (%) | OHV (mg KOH/g) | FT (NTU) | STERC at CMC (ms$^{-1}$) |
|---|---|---|---|---|---|
| E1 | Polyglyceryl-10 Heptanoate | 14.3% | 528 | 800 | ND |
| E2 | Polyglyceryl-10 Heptanoate | 9.0% | 637 | 6.56 | 2115 |

TABLE 5-continued

Solubilization of 1% Spectrastat™ G2 Natural by 5% solubilizer.

| Example | INCI | DE (%) | OHV (mg KOH/g) | FT (NTU) | STERC at CMC (ms⁻¹) |
|---|---|---|---|---|---|
| E3 | Polyglyceryl-10 Heptanoate | 6.5% | 679 | 221 | ND |
| E4 | Polyglyceryl-10 Heptanoate | 10.0% | 612 | 7.7 | 2225 |
| E5 | Polyglyceryl-10 Heptanoate | 8.2% | 631 | 8.66 | ND |
| E6 | Polyglyceryl-10 Heptanoate | 10.9% | 599 | 8.76 | 2288 |
| E7 | Polyglyceryl-10 Hexanoate | 9.6% | 615 | 1686 | 2416 |
| E8 | Polyglyceryl-10 Caprylate | 9.4% | 617 | 5.04 | 2205 |
| Comparative Examples | | | | | |
| CE3 | Polyglyceryl-10 Caprylate | 13.3% | 492 | 57.1 | 1964 |
| CE4 | Heptyl Glucoside | N/A | 497 | 4.21 | 3226 |

ND = Not Determined

Examples 2, 4, 5, 6, and 8 formed clear formulations of 1% Spectrastat™ G2 Natural with FT values less than 9.0 NTU when used at 5%. Example 7, Polyglyceryl-10 Hexanoate, did not form a transparent solution at 5%; however, when used at 7%, Example 7 produced a 1% formulation of Spectrastat™ G2 Natural with a turbidity of 6.54 NTU. The decreased efficiency of Example 7 is attributed to the shorter $C_6$ fatty ester of Polyglyceryl-10 Hexanoate which renders it less lipophilic than the $C_7$ and $C_8$ fatty esters of the other Examples. The Polyglyceryl-10 Heptanoates of Examples 1 and 3 formed opaque emulsions and Comparative Example 3, the commercial Polyglyceryl-10 Caprylate, formed a hazy translucent formulation with a turbidity of 57.1 NTU. Comparative Example 4, Heptyl Glucoside, exhibited the greatest clarity, with a turbidity value of 4.21 NTU.

FIG. 1 shows the turbidity of 1% formulations of Spectrastat™ G2 Natural when formulated with 5% of the various Polyglyceryl-10 Heptanoates as a function of the DE for the series of Polyglyceryl-10 Heptanoate examples. For the Polyglyceryl-10 Heptanoate compositions, ideal solubilization performance is achieved when the OHV of the PGE composition is greater than 528 mg KOH/g and the DE is between 8%-11%. Example 8, Polyglyceryl-10 Caprylate, also exhibits OHV and DE values in this range and formed a transparent formulation with a FT of 5.04 NTU. Examples 1 and 3 are respectively too hydrophobic (low OHV, excessive DE) and too hydrophilic (insufficient DE) to perform well as O/W microemulsifiers for Spectrastat™ G2 Natural. Similarly, Comparative Example 3, commercial Polyglyceryl-10 Caprylate, exhibits low OHV (492 mg KOH/g) and excessive DE (13.3%) compared to the Polyglyceryl-10 Caprylate of Example 8 (OHV=617 mg KOH/g and DE=9.4%), and thus Comparative Example 3 does not perform as well, yielding a hazy solution.

Example 11: Preservation Efficacy of a Solubilized Multifunctional Preservation System The effect of various solubilizers on preservation efficacy was assessed by preparing the formulations shown in Table 6 using the following procedure: Water (95% of total water required for batch) was charged to an appropriately sized beaker of known tare weight equipped with overhead mechanical stirrer and anchor-type blade. Mixing was started at low-medium speed and the indicated solubilizer was added to the water and mixed until completely dissolved. Spectrastat™ G2 Natural was added to the batch and mixed until a uniformly mixed, homogenous solution was formed. The formulation pH was adjusted to pH to 6.6±0.2 using a 10% solution of citric acid. The remaining water was added in q.s. to reach 100%, and the batch was mixed until uniform and then discharged to an appropriate container for storage.

TABLE 6

Formulations for evaluation of solubilizer effect on preservation efficacy.

| Ingredient-INCI Name | Trade Name (Supplier) | Formula Wt % (as supplied) | | | |
|---|---|---|---|---|---|
| | | A | B | C | D |
| Water | Purified Water | Q.S. to 100 wt % | | | |
| Glyceryl Caprylate (and) Caprylhydroxamic Acid (and) Glycerin | Spectrastat G2 Natural (INOLEX) | 1.00 | 1.00 | 1.00 | 1.00 |
| Solubilizer | | | | | |
| Heptyl Glucoside | Comp Ex 4, Sepiclear G7 (Seppic) | — | 3.30 | — | — |
| Polyglyceryl-10 Caprylate | Comp Ex 3, Glyster MCA-750 (SY Kogyo) | — | — | 4.50 | — |
| Polyglyceryl-10 Heptanoate | Ex 2, PG-10H, D-684-059 | — | — | — | 4.50 |
| pH adjuster | | | | | |
| Citric Acid | Citric acid (Sigma-Aldrich), 10% aq. solution | Q.S. to pH 6.4-6.8 | | | |
| | Formulation Turbidity (NTU) | >100 | 5.2 | 57.1 | 5.7 |
| | Solubilizer OHV (mg KOH/g) | — | 497 | 492 | 637 |
| | Solubilzer DE (%) | — | N/A | 13.3% | 9.0% |
| | Solubilizer STERC (s⁻¹) | — | 3226 | 1964 | 2115 |

Table 6 reports the turbidity values for the formulations as well data for the OHV, DE, and STERC for each solubilizer evaluated. Formulation A (no solubilizer) forms an opaque dispersion with a turbidity >100 NTU. Formulation B using Comparative Example 4, the Heptyl Glucoside performance benchmark, and Formulation D using Example 2, Polyglyceryl-10 Heptanoate, both formed transparent solutions with turbidity values of 5.2 and 5.7, respectively. Formulation C using Comparative Example 3, the commercial Polyglyceryl-10 Caprylate, formed a hazy solution with a turbidity of 57.1.

A MCT complying with the USP and PCPC compendial test methodologies was performed to determine the preservative efficacy of Spectrastat™ G2 Natural in the formulations. The results are shown in Tables 7A-7D. Formulations A and B demonstrate good preservation efficacy, achieving strong reductions for the five microorganisms by Day 14. Formulation C prepared using the comparative PGE composition showed weak preservation efficacy against most microorganisms, and the MCT was suspended at Day 14. Formulation D prepared using the inventive PGE composition showed significantly stronger preservation efficacy, achieving greater reductions in microbial growth than Formulation C. The improved preservation efficacy of Formulation D compared to Formulation C is attributed to the higher STERC value for the inventive PGE composition. (2115 $ms^{-1}$ vs. 1964 $ms^{-1}$).

TABLE 7A

MCT data for Example 11, Formulation A.
$Log_{10}$ CFU/g

|  | Staphylococcus aureus | Esherichia coli | Pseudomonas aeruginosa | Candida albicans | Aspergillus brasiliensis |
|---|---|---|---|---|---|
| Inoculum Level | 6.04 | 6.04 | 6.03 | 5.02 | 5.00 |
| Day 2 | <1 | <1 | 2.99 | <1 | 2.96 |
| Day 7 | <1 | <1 | <1 | <1 | <1 |
| Day 14 | <1 | <1 | <1 | <1 | <1 |
| Day 21 | <1 | <1 | <1 | <1 | <1 |
| Day 28 | <1 | <1 | <1 | <1 | <1 |

TABLE 7B

MCT data for Example 11, Formulation B.
$Log_{10}$ CFU/g

|  | Staphylococcus aureus | Esherichia coli | Pseudomonas aeruginosa | Candida albicans | Aspergillus brasiliensis |
|---|---|---|---|---|---|
| Inoculum Level | 6.37 | 6.38 | 6.28 | 5.55 | 5.35 |
| Day 2 | <1 | <1 | <1 | <1 | 4.19 |
| Day 7 | <1 | <1 | <1 | <1 | 3.82 |
| Day 14 | <1 | <1 | <1 | <1 | 2.41 |
| Day 21 | <1 | <1 | <1 | <1 | <1 |
| Day 28 | <1 | <1 | <1 | <1 | <1 |

TABLE 7C

MCT data for Example 11, Formulation C.
$Log_{10}$ CFU/g

|  | Staphylococcus aureus | Esherichia coli | Pseudomonas aeruginosa | Candida albicans | Aspergillus brasiliensis |
|---|---|---|---|---|---|
| Inoculum Level | 6.37 | 6.38 | 6.28 | 5.55 | 5.35 |
| Day 2 | <1 | 3.84 | 2.60 | 1.18 | 4.56 |
| Day 7 | <1 | 2.04 | 5.48 | <1 | 4.37 |
| Day 14 | <1 | <1 | 6.00 | <1 | 3.60 |
| Day 21 | NT | NT | NT | NT | NT |
| Day 28 | NT | NT | NT | NT | NT |

NT = Not Tested

TABLE 7D

MCT data for Example 11, Formulation D.
Log$_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 5.86 | 5.94 | 5.93 | 5.78 | 5.7 |
| Day 2 | <1 | <1 | 3.94 | <1 | 2.90 |
| Day 7 | <1 | <1 | 3.43 | <1 | 2.80 |
| Day 14 | <1 | <1 | 2.6 | <1 | 2.30 |
| Day 21 | <1 | <1 | 1.48 | <1 | <1 |
| Day 28 | <1 | <1 | 3.11 | <1 | <1 |

Example 12. Preparation of Self-Dispersing Concentrates (SDCs)

The SDCs shown in Table 8 were prepared by combining and mixing the specified amounts of each ingredient and mixing at 40-45° C. until uniform, homogeneous compositions were obtained.

TABLE 8

Self-dispersing concentrate (SDC) compositions of Examples 12A-D.

| Ingredient-INCI Name | Trade Name (Supplier) | Formula Wt % (as supplied) | | | |
|---|---|---|---|---|---|
| | | Ex 12A | Ex 12B (5:1) | Ex 12C (6:1) | Ex 12D (7:1) |
| Glyceryl Heptanoate | Lexgard Natural GH70 (INOLEX) | 12.5 | — | — | — |
| Caprylhydroxamic Acid | Spectrastat CHA (INOLEX) | 2.5 | — | — | — |
| Propanediol | Zemea Propanediol (DuPont Tate & Lyle) | 10.0 | — | — | — |
| Polyglyceryl-10 Heptanoate | Ex 2, PG-10H, D-684-059 | 75.0 | 83.3 | 85.7 | 87.5 |
| Methyl-heptylglycerin | Lexgard MHG Natural MB (INOLEX) | — | 16.7 | 14.3 | 12.5 |
| | | 100.0 | 100.0 | 100.0 | 100.0 |

Example 13: Preservation Efficacy of Micellar Water Formulations

The effect of various solubilizers on preservation efficacy was assessed by preparing the micellar water formulations shown in Table 9 using the following procedure: Water (95% of total water required for batch) was charged to an appropriately sized beaker of known tare weight equipped with overhead mechanical stirrer and anchor-type blade. Mixing was started at low-medium speed and the indicated solubilizer was added to the water and mixed until completely dissolved. An multifunctional preservation system comprising glyceryl heptanoate (45%), caprylhydroxamic acid (10%), and propanediol (45%) was added to the batch and mixed until a uniformly mixed, homogenous solution was formed. The formulation pH was adjusted to pH to 6.6±0.2 using a 10% solution of citric acid. The remaining water was added in q.s. to reach 100%, and the batch was mixed until uniform and then discharged to an appropriate container for storage. For Formulation H, the SCD of Example 12D was added to the batch instead of adding the multifunctional preservation system and solubilizer separately. All micellar waters were clear, transparent solutions with turbidity values less than 4.0 NTU (Table 9).

TABLE 9

Micellar water formulations of Example 13.

| Ingredient-INCI Name | Trade Name (Supplier) | Formula Wt % (as supplied) | | | |
|---|---|---|---|---|---|
| | | E | F | G | H |
| Water | Purified Water | Q.S.to 100 wt % | Q.S.to 100 wt % | Q.S.to 100 wt % | Q.S.to 100 wt % |
| Glyceryl Heptanoate (and) Caprylhydroxamic Acid (and) Propanediol | D-682-044 Blend H (INOLEX) | 1.00 | 1.00 | 1.00 | — |
| Heptyl Glucoside | Comp Ex 3, Sepiclear G7 (Seppic) | 3.00 | — | — | — |
| Polyglyceryl-10 Heptanoate | Ex 2, PG-10H, D-684-059 | — | 2.00 | 3.00 | — |
| Polyglyceryl-10 Heptanoate (and) Glyceryl Heptanoate (and) Caprylhydroxamic Acid (and) Propanediol | Ex 12A, D-684-096 | — | — | — | 4.00 |

TABLE 9-continued

Micellar water formulations of Example 13.

| Ingredient-INCI Name | Trade Name (Supplier) | Formula Wt % (as supplied) | | | |
|---|---|---|---|---|---|
| | | E | F | G | H |
| pH adjuster | | | | | |
| Citric Acid | Citric acid (Sigma-Aldrich), 10% aq. solution | Q.S.to pH 6.4-6.8 | Q.S.to pH 6.4-6.8 | Q.S.to pH 6.4-6.8 | Q.S.to pH 6.4-6.8 |
| | Turbidity (NTU) | 0.63 | 0.93 | 1.3 | 3.5 |

A MCT complying with the USP and PCPC compendial test methodologies was performed to determine the preservative efficacy of the micellar water formulations. The results are shown in Tables 10A-10D. All formulations demonstrate good preservation efficacy, achieving strong reductions for the five microorganisms by Day 14 and meeting the success criteria for preservation efficacy according to the USP, PCPC, and EP compendia) guidelines. Both Formulations F and G, prepared with an inventive PGE composition (Example 2), and Formulation H, prepared with an inventive SDC (Example 12A), achieved a desirable combination of clarity and preservation efficacy, meeting the performance benchmark of Formulation E, prepared with Heptyl Glucoside (Comparative Example 3).

TABLE 10A

MCT data for Example 13, Formulation E.
$Log_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 5.86 | 5.94 | 5.93 | 5.78 | 5.70 |
| Day 2 | <1 | <1 | <1 | <1 | 2.30 |
| Day 7 | <1 | <1 | <1 | <1 | <1 |
| Day 14 | <1 | <1 | <1 | <1 | <1 |
| Day 21 | <1 | <1 | <1 | <1 | <1 |
| Day 28 | <1 | <1 | <1 | <1 | <1 |

TABLE 10B

MCT data for Example 13, Formulation F.
$Log_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 5.86 | 5.94 | 5.93 | 5.78 | 5.70 |
| Day 2 | <1 | <1 | <1 | <1 | 2.70 |
| Day 7 | <1 | <1 | <1 | <1 | <1 |
| Day 14 | <1 | <1 | <1 | <1 | <1 |
| Day 21 | <1 | <1 | <1 | <1 | <1 |
| Day 28 | <1 | <1 | <1 | <1 | <1 |

TABLE 10C

MCT data for Example 13, Formulation G.
$Log_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 5.86 | 5.94 | 5.93 | 5.78 | 5.70 |
| Day 2 | <1 | <1 | <1 | 1.70 | 2.70 |
| Day 7 | <1 | <1 | <1 | <1 | <1 |
| Day 14 | <1 | <1 | <1 | <1 | <1 |
| Day 21 | <1 | <1 | <1 | <1 | <1 |
| Day 28 | <1 | <1 | <1 | <1 | <1 |

TABLE 10D

MCT data for Example 13, Formulation H. $Log_{10}$ CFU/g

| | Staphylococcus aureus | Esherichia coli | Pseudomonas aeruginosa | Candida albicans | Aspergillus brasiliensis |
|---|---|---|---|---|---|
| Inoculum Level | 5.87 | 5.94 | 5.94 | 5.11 | 5.70 |
| Day 2 | <1 | <1 | <1 | 2.43 | 2.86 |
| Day 7 | <1 | <1 | <1 | <1 | 2.86 |
| Day 14 | <1 | <1 | <1 | <1 | 2.00 |
| Day 21 | <1 | <1 | <1 | <1 | <1 |
| Day 28 | <1 | <1 | <1 | <1 | <1 |

Example 14. Preparation of O/W Microemulsions Using SDCs

To demonstrate the utility of the inventive SDCs for preparing O/W microemulsion formulations, the SDCs of Examples 12B, 12C, and 12D were used to prepare the formulations shown in Table 11. The formulations were prepared on a 20 g scale by charging the appropriate amount of each ingredient to a 20 mL scintillation vial and then mixing on a vortex mixer until uniform. The microemulsions were allowed to settle until no bubbles were present in the solution and then the turbidity was measured. The turbidity measurement was repeated after the microemulsions were allowed to age for 24 hr. Solutions with turbidity values greater than 100 NTU at the time of preparation were considered thermodynamically unstable macroemulsions and were not evaluated further for turbidity at 24 hr.

TABLE 11

O/W microemulsion screening formulations of Example 14.

| Ingredient-INCI Name | Trade Name (Supplier) | Formula Wt % (as supplied) | | |
|---|---|---|---|---|
| | | H | I | J |
| Water | Purified Water | Q.S.to 100 wt % | Q.S.to 100 wt % | Q.S.to 100 wt % |
| Polyglyceryl-10 Heptanoate (and) Methylheptylglycerin | Example 12B, 5:1 | 10.00 | — | — |
| Polyglyceryl-10 Heptanoate (and) Methylheptylglycerin | Example 12C, 6:1 | — | 10.00 | — |
| Polyglyceryl-10 Heptanoate (and) Methylheptylglycerin | Example 12D, 7:1 | — | — | 10.00 |
| Tocopherol | Vitamin E, dl-alpha tocopherol (DSM) | 0.10 | 0.10 | 0.10 |
| Citrus Aurantium Dulcis (Orange) Peel Oil | Orange Oil (NOW Foods) | 0-2.00 | 0-3.00 | 0-3.50 |

Figure 2A:
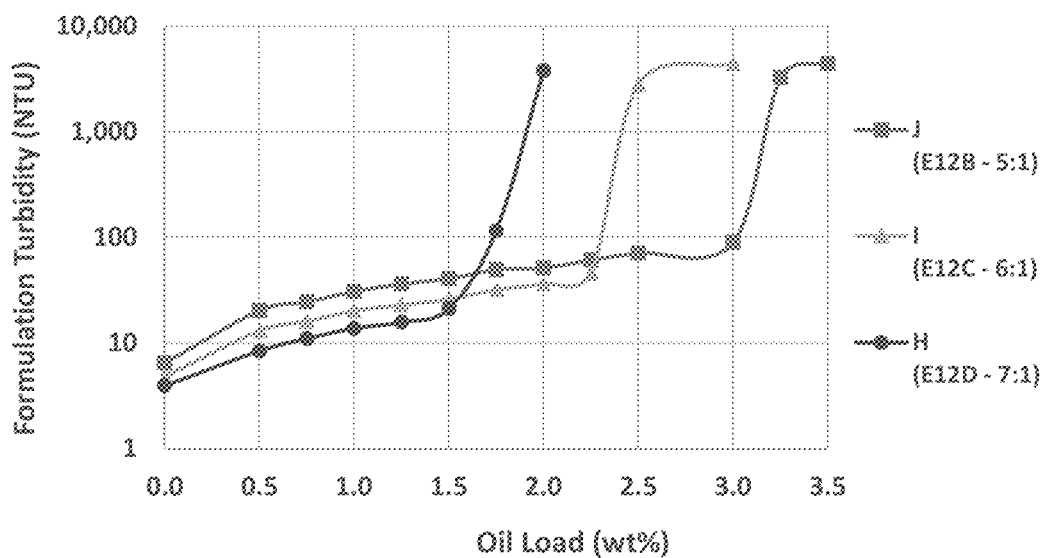
FIG. 2A illustrates O/W microemulsion turbidity values as a function of oil load for Example 14, at time of preparation. Formulations with turbidity values >100 NTU are considered thermodynamically unstable macroemulsions.
Figure 2B:
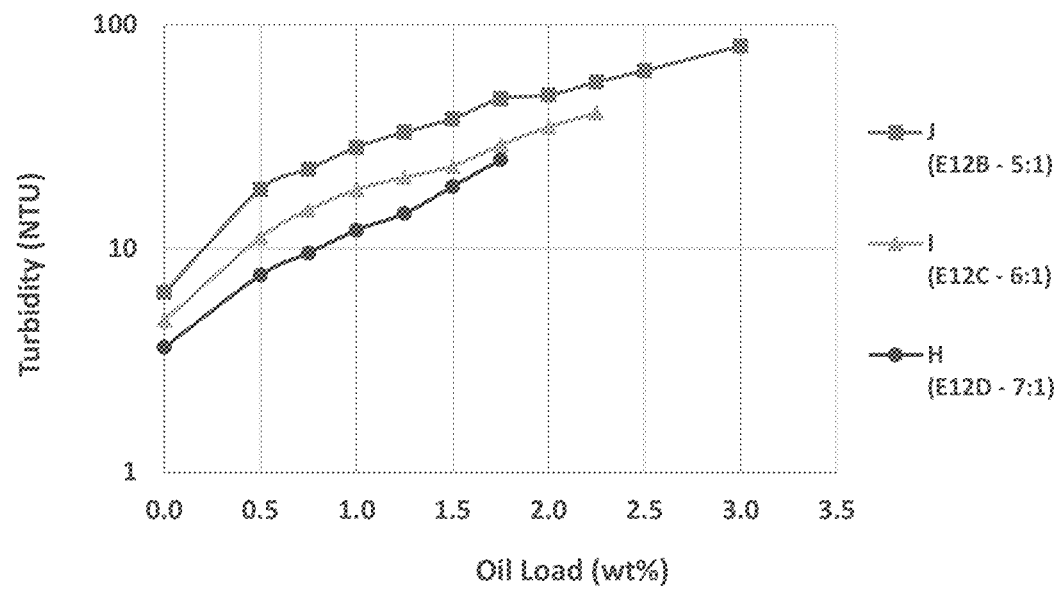
FIG. 2B illustrates O/W microemulsion turbidity values as a function of oil load for Example 14, after 24 hr.

The turbidity data for the formulations prepared using the SDCs as microemulsifiers is shown in Table 12. As the ratio of Polyglyceryl-10 Heptanoate:Methylheptylglycerin increases from 5:1 (Example 12B) to 7:1 (Example 12D), the oil solubilizing capacity of the systems is observed to increase, as evidenced by the maximum amount of orange oil the system can solubilize before the turbidity exceeds 100 NTU. Although the SDC of Example 12D (7:1) has the lowest oil solubilizing capacity of the series, it does yield O/W microemulsions with greater clarity, as indicated by the lower turbidity values at a given oil load. The clarity data suggest that at a given oil load, microemulsion droplet size decreases as the ratio of Polyglyceryl-10 Hepanoate:Methylheptylglycerin decreases from 7:1 to 5:1, as smaller droplets scatter less light leading to lower turbidity values. FIGS. 2A and 2B show O/W microemulsion turbidity as a function of oil load for the three different SDCs both at time of microemulsion preparation and after 24 hr. O/W microemulsion formulations with turbidity values less than 100 NTU were observed to remain stable and transparent for weeks after preparation, indicating the formation of thermodynamically stable microemulsion systems.

TABLE 12

Turbidity data for the O/W microemulsions of Example 14.

| | Turbidity (NTU) | | |
|---|---|---|---|
| Oil Load (wt %) | J (E12B-5:1) | I (E12C-6:1) | H (E12D-7:1) |
| At Preparation | | | |
| 0 | 6.45 | 4.81 | 3.92 |
| 0.5 | 20.2 | 13.0 | 8.38 |
| 0.75 | 24.4 | 16.0 | 10.99 |
| 1.00 | 30.6 | 20.1 | 13.7 |
| 1.25 | 36.0 | 22.8 | 15.7 |
| 1.50 | 40.6 | 25.9 | 21.2 |
| 1.75 | 49.2 | 31.8 | 115 |
| 2.00 | 51.1 | 36.2 | 3783 |
| 2.25 | 60.8 | 45.5 | — |
| 2.50 | 70.6 | 2757 | — |
| 3.00 | 89.3 | 4400 | — |
| 3.25 | 3234 | — | — |
| 3.50 | 4400 | — | — |
| After 24 h | | | |
| 0.00 | 6.36 | 4.79 | 3.62 |
| 0.50 | 18.4 | 11.2 | 7.6 |
| 0.75 | 22.6 | 14.9 | 9.53 |
| 1.00 | 28.3 | 18.3 | 12.1 |
| 1.25 | 33.1 | 20.8 | 14.3 |
| 1.50 | 37.9 | 23.3 | 18.9 |
| 1.75 | 46.6 | 29.0 | 24.9 |
| 2.00 | 48.5 | 34.9 | — |
| 2.25 | 55.4 | 40.3 | — |
| 2.50 | 62.3 | — | — |
| 3.00 | 80.4 | — | — |

Example 15. Comparison of Inventive PGE Composition vs. Commercially Available PGE Composition for Solubilization of Multifunctional Preservation Systems

TABLE 13

Micellar water formulations comprising PGE compositions and multifunctional preservation systems.

| Ingredient - INCI Name | Trade Name (Supplier) | Formula Wt % (as supplied) | | | | | |
|---|---|---|---|---|---|---|---|
| | | E15A | CE15A | E15B | CE15B | E15C | CE15C |
| Water | Purified Water | Q.S. to 100 wt % | Q.S. to 100 wt % | Q.S. to 100 wt % | Q.S. to 100 wt % | Q.S. to 100 wt % | Q.S. to 100 wt % |
| Caprylhydroxamic Acid (and) Glyceryl Caprylate (and) Glycerin | Spectrastat ™ G2 Natural MB (INOLEX) | 1.50 | 1.50 | 1.50 | 1.50 | — | — |
| Caprylhydroxamic Acid (and) Methylheptylglycerin (and) Glycerin | Spectrastat ™ MHG Natural MB (INOLEX) | — | — | — | — | 1.50 | 1.50 |
| Polyglyceryl-10 Heptanoate | Example 2, PG-10H, D-684-059 | 6.00 | — | 6.80 | — | 5.10 | — |
| Polyglyceryl-10 Caprylate/Caprate | Polyaldo ™ 10-1-CC K (Arxada) | — | 6.00 | — | 6.80 | — | 5.10 |
| Formulation Turbidity (NTU) | | 9.90 | 211 | 8.93 | 98.5 | 9.24 | 94.8 |

Micellar water formulations comprising either an inventive PGE composition (Example 2) or a commercially available PGE composition (Comparative Example 5) were prepared and evaluated for formulation turbidity. The data in Table 13 demonstrate that the inventive PGE composition bearing a heptanoate ($C_7$) ester functionality yields dramatically clearer formulations with turbidity values <10 NTU compared to the commercially-available PGE composition bearing a mixture of caprylate ($C_8$) and caprate ($C_{10}$) ester functionalities.

EXAMPLE 16: Solubilization of Essential Oils in Micellar Water Formulations

Examples 16A-16H, as shown in Table 14, are micellar water formulations comprising essential oils and Zeastat™, a multifunctional preservation ingredient comprised of caprylhydroxamic acid and propanediol. These examples demonstrate the utility of the inventive PGE composition of Example 2 for the preparation of clear micellar water formulations containing fragrant essential oils. In all cases, a minimum of 5.00% PGE composition was required to microemulsify 0.5% essential oil in the formulation, as indicated by FT value <10 NTU. These formulations do not require the use of a medium-chain terminal diol in combination with the PGE composition to obtain formulations with turbidity values <10 NTU, thus demonstrating the ability of the inventive PGE composition to yield clear microemulsions of essential oils.

TABLE 14

Micellar water formulations comprising inventive PGE compositions and essential oils.

| Ingredient (INCI Name) | Trade Name (Supplier) | Formula Wt % (as supplied) | | | | | | | | | |
|---|---|---|---|---|---|---|---|---|---|---|---|
| | | E16A | E16B | E16C | E16D | E16E | E16F | E16G | E16F | E16G | E16H |
| Water | Purified Water | Q.S. to 100 wt % | Q.S. to 100 wt % | Q.S. to 100 wt % | Q.S. to 100 wt % | Q.S. to 100 wt % | Q.S. to 100 wt % | Q.S. to 100 wt % | Q.S. to 100 wt % | Q.S. to 100 wt % | Q.S. to 100 wt % |
| Caprylhydroxamic Acid (and) Propanediol | Zeastat ™ (INOLEX) | 1.00 | 1.00 | 1.00 | 1.00 | 1.00 | 1.00 | 1.00 | 1.00 | 1.00 | 1.00 |
| *Pelargonium Graveolens* (Geranium) Leaf Oil | Geranium Oil (NOW Foods) | 0.50 | 0.50 | 0.50 | — | — | — | — | — | — | — |
| *Cymbopogon Winterianus* (Citronella) Leaf Oil | Citronella Oil (NOW Foods) | — | — | — | 0.50 | 0.50 | 0.50 | — | — | — | — |
| *Lavandula Angustifolia* (Lavender) Flower Oil | Lavender Oil (NOW Foods) | — | — | — | — | — | — | 0.50 | 0.50 | 0.50 | 0.50 |

TABLE 14-continued

Micellar water formulations comprising inventive PGE compositions and essential oils.

| Ingredient (INCI Name) | Trade Name (Supplier) | Formula Wt % (as supplied) | | | | | | | | | |
|---|---|---|---|---|---|---|---|---|---|---|---|
| | | E16A | E16B | E16C | E16D | E16E | E16F | E16G | E16F | E16G | E16H |
| Polyglyceryl-10 Heptanoate | Example 2, PG-10H, D-684-059 | 2.00 | 5.00 | 7.00 | 2.00 | 5.00 | 7.00 | 2.00 | 3.00 | 5.00 | 7.00 |
| pH | | 3.95 | 3.92 | 3.96 | 5.6 | 5.07 | 5.12 | 5.14 | 5.12 | 4.78 | 4.77 |
| Formulation Turbidity (NTU) | | 3160 | 5.09 | 3.77 | 3189 | 5.88 | 3.89 | 1833 | 1403 | 4.13 | 3.5 |

The present invention is not to be limited in scope by the specific embodiments described herein. Indeed, various modifications of the invention in addition to those described herein will be apparent to those skilled in the art from the foregoing description and figures. Such modifications are intended to fall within the scope of the appended claims.

It is further to be understood that all values are approximate and are provided for description. All references cited and discussed in this specification are incorporated herein by reference in their entirety and to the same extent as if each reference was individually incorporated by reference.

What is claimed is:

1. A biobased polyglyceryl ester microemulsifier composition comprising:
   a mixture including one or more compounds of Formula (I):

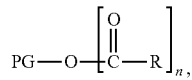

wherein: PG is a polyglyceryl group comprising greater than 40% hexaglycerol and higher polyglycerols and less than 60% pentaglycerol and lower polyglycerols, R is a linear $C_6$ alkyl group and RCO is derived from n-heptanoic acid,
   n=from 1 to 3, and
   wherein substantially all of the carbon present in the one or more compounds of Formula (I) is biobased and wherein the composition has a degree of esterification (DE) of from about 6% to less than about 15% and a concentration of pendant hydroxyl groups of greater than about 15.2 wt %.

2. The composition of claim 1, wherein n=1.

3. The composition of claim 1, wherein PG is a polyglyceryl group comprising greater than 60% hexaglycerol and higher polyglycerols and less than 40% pentaglycerol and lower polyglycerols.

4. The composition of claim 1, wherein the composition contains less than about 0.5 wt % of free fatty acid R—COOH.

5. A formulation comprising the composition of claim 1.

6. The formulation of claim 5, wherein the formulation is or is a component of a personal care product, a home care product, a textile care product, an institutional care product, a pharmaceutical product, a veterinary product, a food product, or an industrial product.

7. The formulation of claim 5, wherein the formulation is or is a component of a personal care product selected from the group consisting of: a cosmetic product, a conditioner of hair, nails, or skin, a shampoo, a hair styling product, an oil or wax for grooming facial hair, a permanent wave liquid, a hair colorant, a face or body wash, a makeup removal product, a cleansing lotion, an emollient lotion or cream, a bar soap, a liquid soap, a shaving cream, foam, or gel, a sunscreen, a gel, lotion or cream for treating sunburn, a deodorant or an anti-perspirant, a moisturizing gel, a shaving foam, a face powder, a foundation, a lipstick, a blush, an eyeliner, a wrinkle or anti-aging cream, an eye shadow, an eyebrow pencil, a mascara, a mouthwash, a toothpaste, an oral care product, a skin cleansing product, a hair cleansing product, and a skin lotion or moisturizer.

8. The composition of claim 1, further comprising at least one of:
   a medium chain terminal diol,
   a medium chain alkylhydroxamic acid, a salt thereof, or combinations thereof, or glycerin and/or a $C_3$-$C_4$ diol.

9. A microemulsification system comprising:
   from about 30 wt % to about 90 wt % biobased polyglyceryl ester microemulsifier composition, wherein the biobased polyglyceryl ester microemulsifier composition is:
   a mixture including one or more compounds of Formula (I):

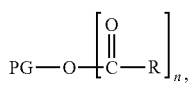

wherein: PG is a polyglyceryl group comprising greater than 40% hexaglycerol and higher polyglycerols and less than 60% pentaglycerol and lower polyglycerols, R is a linear $C_6$ alkyl group and RCO is derived from biobased n-heptanoic acid,
   n=from 1 to 3, and
   wherein substantially all of the carbon present in the one or more compounds of Formula (I) is biobased and wherein the biobased polyglyceryl ester microemulsifier composition has a degree of esterification (DE) of from about 6% to less than about 15% and a concentration of pendant hydroxyl groups of greater than about 15.2 wt %;
   from about 5 wt % to about 50 wt % medium chain terminal diol; and
   from about 0.1 wt % to about 20 wt % medium chain alkylhydroxamic acid, a salt thereof, or combinations thereof.

10. The microemulsification system of claim 9, wherein the medium chain terminal diol is selected from the group consisting of alkanediols, glyceryl ethers, and glyceryl esters.

11. The microemulsification system of claim 10, wherein the medium chain terminal diol is selected from $C_5$-$C_{10}$ 1,2-alkanediols, $C_6$-$C_{12}$ alkyl glyceryl ethers, $C_6$-$C_{12}$ acyl glyceryl monoesters, and combinations thereof.

12. The microemulsification system of claim 9, wherein the microemulsification system comprises a medium chain alkylhydroxamic acid selected from a $C_6$-$C_{12}$ alkylhydroxamic acid, a salt thereof, and combinations thereof.

13. The microemulsification system of claim 9, wherein the microcruemulsification system further comprises glycerin and/or a $C_3$-$C_4$ diol selected from propanediol, 1,2-propanediol, 1,3-propanediol, 1,2-butanediol, 1,3-butanediol, 2,3-butanediol, 1,4-butanediol, methylpropanediol, and combinations thereof.

14. The microemulsification system of claim 9, wherein the ratio of polyglyceryl ester to medium chain terminal diol is from about 1:1 to about 10:1.

15. The microemulsification system of claim 9, wherein the biobased polyglyceryl ester microemulsifier composition contains less than about 0.5 wt % of free fatty acid R—COOH.

16. The biobased polyglyceryl ester microemulsifier composition of claim 1, wherein the composition has a degree of esterification (DE) of greater than about 7% and less than about 12.5%.

17. The biobased polyglyceryl ester microemulsifier composition of claim 16, wherein the composition has a degree of esterification (DE) of greater than about 8% and less than about 11%.

18. The microemulsification system of claim 9, wherein the biobased polyglyceryl ester microemulsifier composition has a degree of esterification (DE) of greater than about 7% and less than about 12.5%.

19. The microemulsification system of claim 18, wherein the biobased polyglyceryl ester microemulsifier composition has a degree of esterification (DE) of greater than about 8% and less than about 11%.

20. A formulation comprising the microemulsification system of claim 9.

21. The microemulsification system of claim 9, wherein the medium chain terminal diol is methylheptylglycerin.

22. A microemulsion comprising the microemulsification system of claim 9 and water.

23. The microemulsion of claim 22, further comprising an oil and/or a microbiostatic or microbiocidal compound.

24. A microemulsion comprising the composition of claim 1 and water.

25. The microemulsion of claim 24, further comprising an oil and/or a microbiostatic or microbiocidal compound.

26. The composition of claim 1, wherein the composition consists of the mixture including one or more compounds of Formula (I), glycerin, and water.

* * * * *